US012591537B2

(12) United States Patent
Ono

(10) Patent No.: US 12,591,537 B2
(45) Date of Patent: Mar. 31, 2026

(54) INFORMATION PROCESSING DEVICE SELECTING FROM AMONG PLURAL ARITHMETIC OPERATION PROGRAMS DIFFERING FROM EACH OTHER WITH RESPECT TO AN ORDER OF OPERATIONS FOR SOLVING A SAME NUMERICAL FORMULA, AND INFORMATION PROCESSING METHOD AND STORAGE MEDIUM

(71) Applicant: CASIO COMPUTER CO., LTD., Tokyo (JP)

(72) Inventor: Manato Ono, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1245 days.

(21) Appl. No.: 17/465,896

(22) Filed: Sep. 3, 2021

(65) Prior Publication Data

US 2022/0092020 A1 Mar. 24, 2022

(30) Foreign Application Priority Data

Sep. 24, 2020 (JP) ................................. 2020-159481
Mar. 24, 2021 (JP) ................................. 2021-050240

(51) Int. Cl.
*G06F 15/02* (2006.01)

(52) U.S. Cl.
CPC .................................... *G06F 15/02* (2013.01)

(58) Field of Classification Search
CPC .................................................... G06F 15/02
See application file for complete search history.

(56) References Cited

U.S. PATENT DOCUMENTS

| | | | |
|---|---|---|---|
| 5,587,823 A | 12/1996 | Yoshino et al. | |
| 10,192,329 B2 * | 1/2019 | Suzuki | G06T 11/206 |
| 2017/0280272 A1 | 9/2017 | Tanaka | |

FOREIGN PATENT DOCUMENTS

| | | | | |
|---|---|---|---|---|
| CN | 104077262 A | * 10/2014 | ............. | G06F 15/02 |
| JP | H06203120 A | 7/1994 | | |
| JP | H06204923 A | 7/1994 | | |
| JP | 2006099256 A | 4/2006 | | |
| JP | 2017174188 A | 9/2017 | | |
| JP | 2017174189 A | 9/2017 | | |
| JP | 2018092675 A | 6/2018 | | |

OTHER PUBLICATIONS

Japanese Office Action dated Aug. 23, 2022 (and English translation thereof) issued in counterpart JP Application No. 2021-050240.

* cited by examiner

*Primary Examiner* — Michael D. Yaary
(74) *Attorney, Agent, or Firm* — Holtz, Holtz & Volek PC

(57) ABSTRACT

In an information processing device, at least one processor acquires edited arithmetic operation data which indicates a result of arithmetic operations which are performed on a numerical formula on the basis of an input operation from a target person, decides whether it is preferable to change an arithmetic operation program which is stored in a memory and is based on the numerical formula, and in a case where it is decided that it is preferable to change the arithmetic operation program, changes the arithmetic operation program on the basis of the edited arithmetic operation result data which is acquired.

17 Claims, 13 Drawing Sheets

INFORMATION PROCESSING DEVICE                    1

120
INPUT UNIT

150
STORAGE UNIT

130
DISPLAY UNIT

160
CONTROL UNIT
(PROCESSING UNIT)

140
POWER SOURCE
UNIT

130

$6 \div 2 ( 1 + 2 )$

1

130

$6 \div 2 ( 1 + 2 )$

$$6 \div 2 ( 1 + 2 )$$

You want to change implicit multiplication setting?

Figures 8, 9:
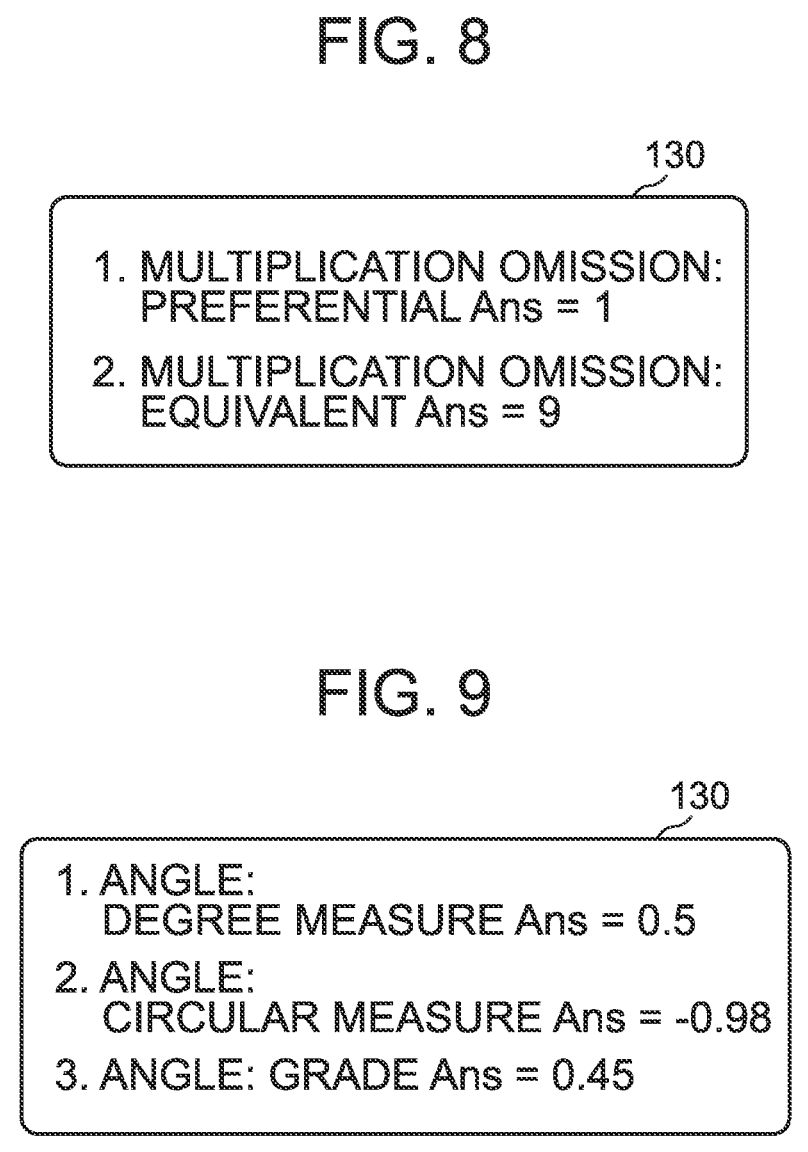

1. MULTIPLICATION OMISSION:
   PREFERENTIAL Ans = 1

2. MULTIPLICATION OMISSION:
   EQUIVALENT Ans = 9

1. ANGLE:
   DEGREE MEASURE Ans = 0.5

2. ANGLE:
   CIRCULAR MEASURE Ans = -0.98

3. ANGLE: GRADE Ans = 0.45

| ANSWERER | A | B | C | D | E |
|---|---|---|---|---|---|
| ANSWER | 1.0 | 1.00 | 1.000 | 1.0000 | 1.0000 |

| ANSWERER | A | B | C | D | E |
|---|---|---|---|---|---|
| ANSWER | 1.0 | 1.00 | 1.000 | 1.0000 | 1.0000 |
| CORRECT/ INCORRECT | CORRECT | CORRECT | CORRECT | CORRECT | CORRECT |

| CORRECT/INCORRECT EDITING | | |
|---|---|---|
| ANSWER | 1.000 | 1.0000 |
| CORRECT/ INCORRECT | INCORRECT | INCORRECT |

| ANSWERER | A | B | C | D | E |
|---|---|---|---|---|---|
| ANSWER | 1.0 | 1.00 | 1.000 | 1.0000 | 1.0000 |
| CORRECT/INCORRECT | CORRECT | CORRECT | INCORRECT | INCORRECT | INCORRECT |

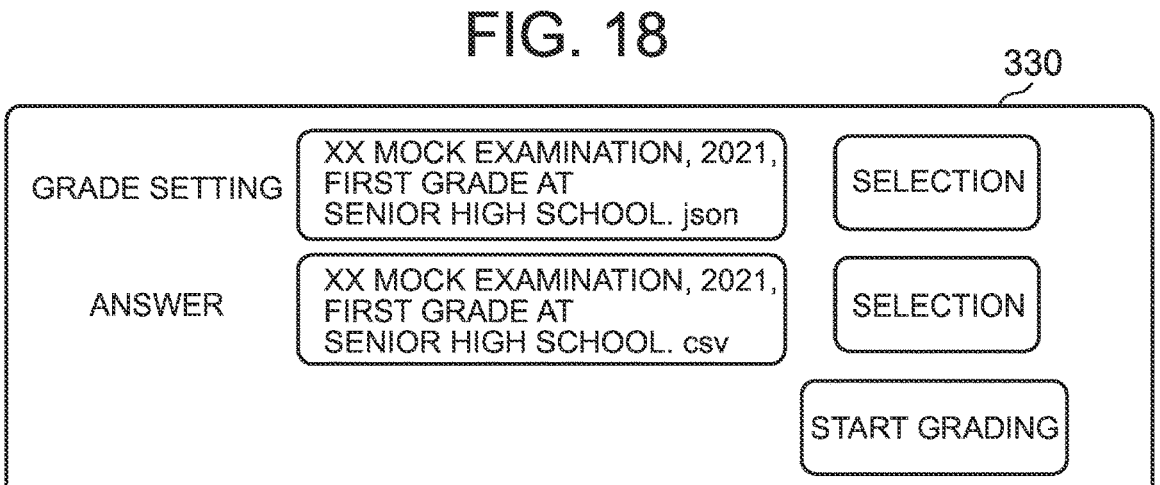

GRADE SETTING | XX MOCK EXAMINATION, 2021, FIRST GRADE AT SENIOR HIGH SCHOOL. json | SELECTION ANSWER | XX MOCK EXAMINATION, 2021, FIRST GRADE AT SENIOR HIGH SCHOOL. csv | SELECTION

START GRADING

GRADE SETTING | XX MOCK EXAMINATION, 2021, FIRST GRADE AT SENIOR HIGH SCHOOL. json | SELECTION ANSWER | XX MOCK EXAMINATION, 2021, FIRST GRADE AT SENIOR HIGH SCHOOL. csv | SELECTION

START GRADING

CHANGE SETTING   IS ZERO-PADDING SETTING REVIEWED?

☑ PERMIT ZERO PADDING OF ALL DECIMALS
☐ PERMIT ZERO PADDING OF DECIMALS DOWN TO FIRST PLACE AFTER DECIMAL POINT
☐ PERMIT ZERO PADDING OF DECIMALS DOWN TO SECOND PLACE AFTER DECIMAL POINT

CHANGE

IS ANGLE SETTING REVIEWED?

☑ DEGREE MEASURE
☐ CIRCULAR MEASURE
☐ GRADE

CHANGE

INFORMATION PROCESSING DEVICE SELECTING FROM AMONG PLURAL ARITHMETIC OPERATION PROGRAMS DIFFERING FROM EACH OTHER WITH RESPECT TO AN ORDER OF OPERATIONS FOR SOLVING A SAME NUMERICAL FORMULA, AND INFORMATION PROCESSING METHOD AND STORAGE MEDIUM

BACKGROUND OF THE INVENTION

1. Field of the Invention

The present invention relates to an information processing device, an information processing method and a storage medium.

2. Description of the Related Art

A scientific electronic calculator which includes an input unit which is used to select one calculation mode from a plurality of calculation modes and to input a numerical value in accordance with an operation of a user and a CPU (Central Processing Unit) which generates transmission data which contains the numerical value which is input via the input unit and mode information for specifying a calculation mode which is selected via the input unit and then generates a two-dimensional code that the transmission data is encoded is disclosed in Japanese Patent Application Laid Open No. 2018-92675.

SUMMARY

According to one aspect of the present invention, there is provided an information processing device including at least one processor and at least one memory which stores an arithmetic operation program which is executed by the at least one processor, in which the at least one processor acquires edited arithmetic operation result data which indicates a result of arithmetic operations which are performed on a numerical formula on the basis of an input operation which is performed by a target person, decides whether it is preferable to change the arithmetic operation program which is stored in the at least one memory and is based on the numerical formula, and in a case where it is decided that it is preferable to change the arithmetic operation program, changes the arithmetic operation program on the basis of the edited arithmetic operation result data which is acquired.

BRIEF DESCRIPTION OF THE SEVERAL VIEWS OF THE DRAWING

FIG. 5 is a diagram illustrating one example of the numerical formula which is displayed on the display unit in the first embodiment and is obtained after editing.

FIG. 6 is a diagram illustrating one example of a message which is displayed on the display unit in the first embodiment for the purpose of confirming with the user about whether it is preferable to change an arithmetic operation setting to be used.

FIG. 8 is a diagram illustrating one example of settings and calculation results which are displayed on a display unit in a second embodiment of the present invention.

FIG. 9 is a diagram illustrating one example of settings and calculation results which are displayed on the display unit in the second embodiment.

FIG. 13 is a diagram illustrating one example of a table which is displayed on a terminal display unit in the third embodiment and indicates answers per answerer.

FIG. 14 is a diagram illustrating one example of a table which is displayed on the terminal display unit in the third embodiment and indicates answers and correct/incorrect decisions per answerer.

FIG. 15 is a diagram illustrating one example of a table which is displayed on the terminal display unit in the third embodiment and indicates answers and edited correct/incorrect results.

FIG. 16 is a diagram illustrating one example of a table which is displayed on the terminal display unit in the third embodiment and indicates answers and correct/incorrect decisions which are obtained after changing the setting per answerer.

FIG. 18 is a diagram illustrating one example of a grade setting data and answer data input screen which is displayed on a terminal display unit in a fourth embodiment of the present invention.

FIG. 19 is a diagram illustrating one example of a setting change screen which is displayed on the terminal display unit in the fourth embodiment.

DETAILED DESCRIPTION OF THE INVENTION

First Embodiment

Figure 1:
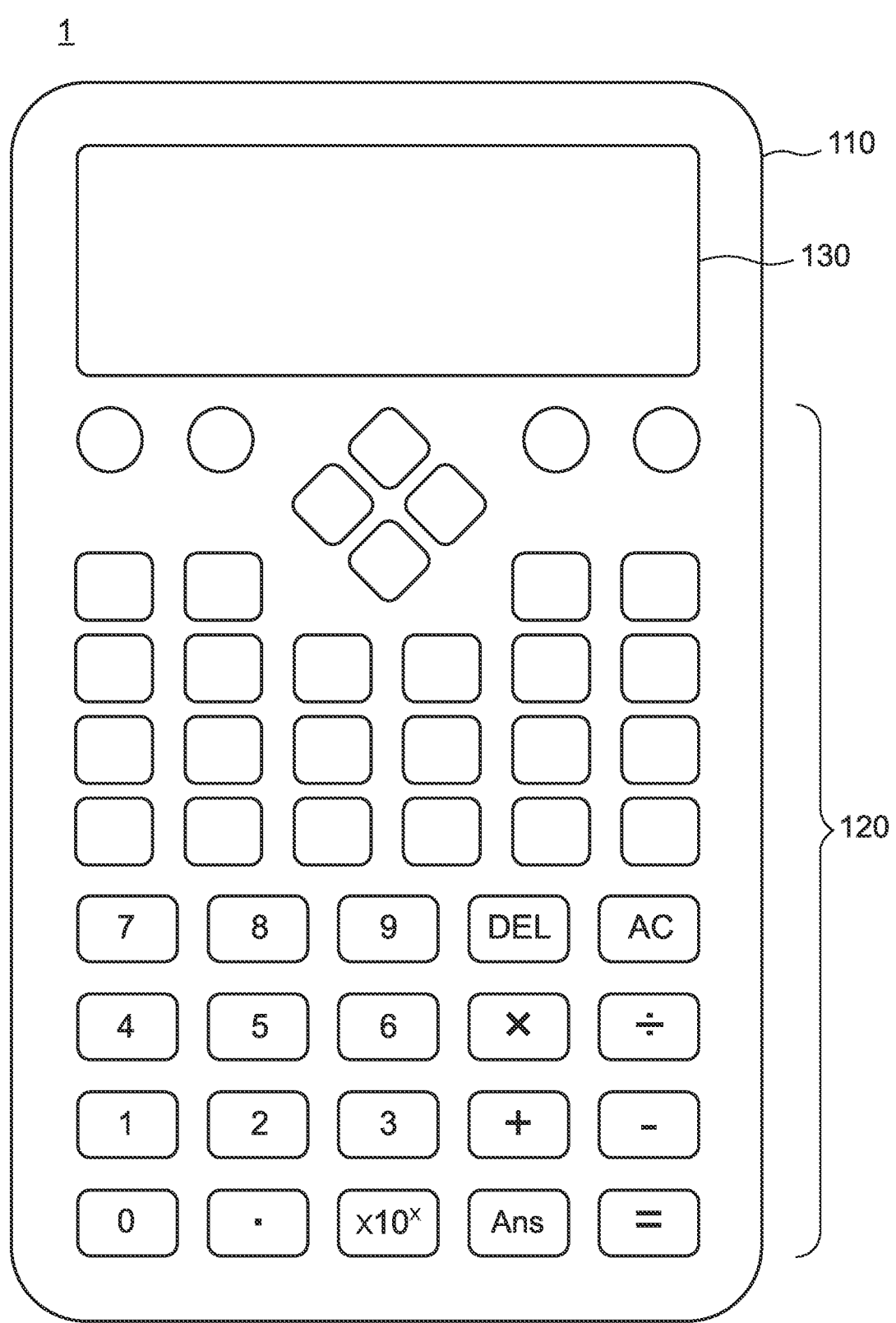
FIG. 1 is a diagram illustrating one example of an outer appearance of an information processing device according to a first embodiment of the present invention.

An information processing device 1 according to the first embodiment of the present invention will be described with reference to the drawings. Incidentally, in the drawings, same numerals are assigned to same or corresponding units. The information processing device 1 according to the first embodiment is a scientific electronic calculator which performs Four arithmetic operations and/or functional calculations in accordance with an input operation by a user who is set as a target person.

FIG. 1 is a diagram illustrating one example of an outer appearance of the information processing device 1 according to the first embodiment of the present invention. As illustrated in FIG. 1, the information processing device 1 includes a case 110, an input unit 120 and a display unit 130.

The input unit 120 and the display unit 130 are arranged on the case 110 in a state of being exposed to the outside and a power source unit 140, a storage unit 150 and a control unit (a processing unit) 160 which will be described later are arranged in the case 110. Although the case 110 may contain, for example, metals and resins, the present invention is not limited to the above.

The input unit 120 includes, for example, a keyboard which has a plurality of keys. Each key is pressed by the user and thereby the input unit 120 outputs a signal which indicates that the key is pressed to the control unit 160 which will be described later. Although the input unit 120 includes keys which correspond to, for example, numerical values, signs, arithmetic operations, function selection, mode selection, cursor movement and a power source operation, the present invention is not limited to the above.

The display unit 130 displays a numerical value and/or a numerical formula that the user inputs, a result of arithmetic operations which are performed on the numerical formula, a mode in which the program is being executed and/or a function which is selected. Although the display unit 130 may include, for example, a liquid crystal display, the present invention is not limited to the above.

Figures 2, 3, 4:
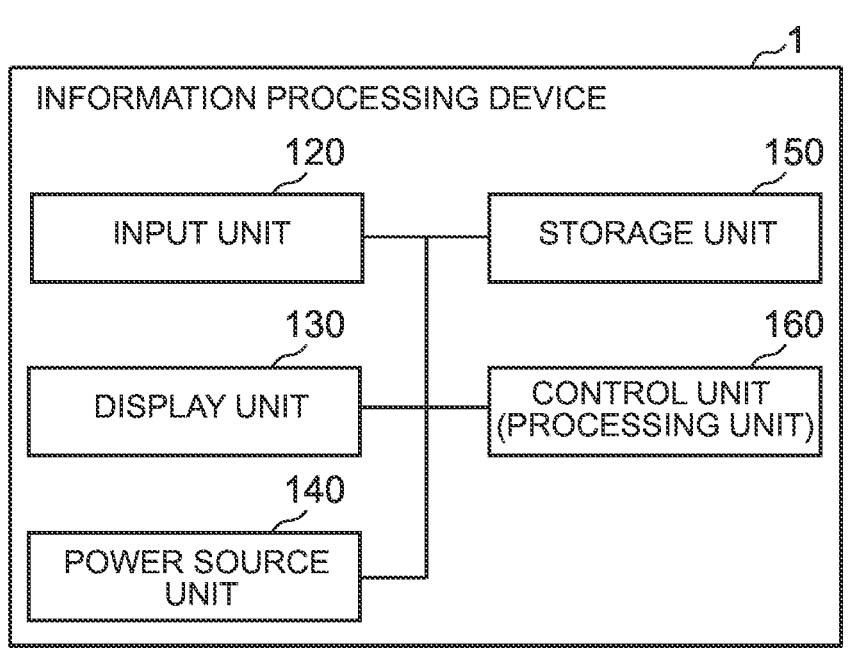
FIG. 2 is a block diagram illustrating one example of a configuration of the information processing device according to the first embodiment.
FIG. 3 is a diagram illustrating one example of a numerical formula which is displayed on a display unit in the first embodiment and is in a not-yet-edited state.
FIG. 4 is a diagram illustrating one example of the numerical formula which is displayed on the display unit in the first embodiment and is in the form of persuading a user to edit a result of arithmetic operations.

FIG. 2 is a block diagram illustrating one example of a configuration of the information processing device 1 according to the first embodiment. As illustrated in FIG. 2, the information processing device 1 includes the input unit 120, the display unit 130, the power source unit 140, the storage unit 150 and the control unit 160.

The power source unit 140 supplies the electric power to the input unit 120, the display unit 130, the storage unit 150 and the control unit 160. Although the power source unit 140 may include, for example, a primary battery, a secondary battery and a solar battery, the present invention is not limited to the above.

The storage unit 150 is a storage medium which stores a program that the control unit 160 executes and/or data which is utilized in execution of the program. Although the storage unit 150 may include a ROM (Read Only Memory) and a RAM (Random Access Memory) which work at least as one memory, the present invention is not limited to the above.

The control unit 160 executes the program which is stored in the storage unit 150 and thereby controls an operation of the entire information processing device 1. Although the control unit 160 may include a CPU (Central Processing Unit) which works at least as one processor, the present invention is not limited to the above.

The control unit 160 executes an arithmetic operation program which is stored in the storage unit 150 and thereby carries out processing of performing the Four arithmetic operations and calculating the function in accordance with an input signal which is transmitted from the input unit 120 and displaying the numerical value, the numerical formula and the result of arithmetic operations which are performed on the numerical formula which are input from the user on the display unit 130.

The control unit 160 selects one arithmetic operation setting from a plurality of arithmetic operation settings which is stored in the storage unit 150 and which pertains to the arithmetic operation program as an arithmetic operation setting to be used and performs calculations in accordance with the selected arithmetic operation setting to be used.

For example, in a case where a multiplication sign is omitted, the storage unit 150 stores such two arithmetic operation settings as follows, that is, (A) a priority of arithmetic operations which are performed on a multiplication that the multiplication sign is omitted is set higher than a priority of arithmetic operations which are performed on multiplication and division and (B) the priority of arithmetic operations which are performed on the multiplication that the multiplication sign is omitted is made equivalent to the priority of arithmetic operations which are performed on the multiplication and division.

For example, a case where the user inputs the following numerical formula will be described.

$$6 \div 2(1+2) \tag{1}$$

In the formula (1), the multiplication sign which is to be originally put between "2" and "(1+2)" is omitted.

In a case where the arithmetic operation setting (A) is selected as the arithmetic operation setting to be used, the control unit 160 gives priority to calculation of "2 (1+2)" that the multiplication sign is omitted, outputs "1" as a result of calculation and displays "1" on the display unit 130.

In a case where the arithmetic operation setting (B) is selected as the arithmetic operation setting to be used, the control unit 160 gives priority to calculation of "6÷2" which is located in front of (1+2) in the input numerical formula in order to make the arithmetic operations on "2 (1+2)" that the multiplication sign is omitted equivalent to the arithmetic operations which are performed on a part that the multiplication sign is not omitted, outputs "9" as a result of calculation and displays "9" on the display unit 130.

Arithmetic operation program setting processing that the control unit 160 executes will be described. FIG. 3 is a diagram illustrating one example of the numerical formula which is displayed on the display unit 130 and is in a not-yet-edited state. As illustrated in FIG. 3, a state where the user inputs the numerical formula (1), the control unit 160 arithmetically operates the numerical formula (1) in accordance with the arithmetic operation program and makes the display unit 130 display the numerical formula (1) and "1" which is a result of calculation of the numerical formula (1) will be described by way of example.

In a case where the numerical formula is input, the control unit 160 parses (performs syntax analysis on) the numerical formula and decides whether omission of the multiplication sign (multiplication omission) is contained in the numerical formula. In a case where the multiplication omission is not contained in the numerical formula, the control unit 160 terminates execution of the arithmetic operation program setting processing. A result of the arithmetic operations which are performed on the numerical formula before the user changes the arithmetic operation setting to be used is called a provisional result of arithmetic operations.

In a state where the numerical formula (1) and "1" which is the result of calculation of the numerical formula (1) that the user inputs are being displayed on the display unit 130, the control unit 160 decides whether the input unit 120 is operated by the user and a signal for requesting to edit the result of arithmetic operations is transmitted to the control unit 160. In a case where the signal for requesting to edit the result of arithmetic operations that the user inputs is transmitted to the control unit 160, the control unit 160 makes the display unit 130 display a notification for making the user perform an input operation for editing the result of arithmetic operations.

FIG. 4 is a diagram illustrating one example of the numerical formula which is displayed on the display unit 130 and is in the form of persuading the user to edit the result of arithmetic operations. As illustrated in FIG. 4, the control unit 160 makes the display unit 130 display a cursor for encouraging the user to perform the input operation into a place (see FIG. 3) where "1" which is the calculation result was displayed before in place of the calculation result "1".

The user operates the input unit 120 in response to the notification for encouraging the user to perform the input operation for editing the result of arithmetic operations which is displayed on the display unit 130 and thereby inputs a numerical value that the user wants to have as a result of calculation of the numerical formula as an edited value. The input unit 120 transmits the edited value which is input to the control unit 160 and thereby the control unit 160 acquires the edited value. The control unit 160 controls the display unit 130 and makes the display unit 130 display the edited value which is acquired. The edited value that the user inputs is a value which is obtained by editing the provisional result of arithmetic operations and is called an edited result of arithmetic operations.

The control unit 160 acquires the edited result of arithmetic operations that the user inputs via the input unit 120.

FIG. 5 is a diagram illustrating one example of a case where the acquired edited value is displayed on the display unit 130 together with the numerical formula. As illustrated in FIG. 5, in a case where the user inputs the numerical value "9" that the user obtains as a result of calculation of the numerical formula (1), the control unit 160 controls the display unit 130 and makes the display unit 130 display the numerical value "9" that the user inputs.

In addition, the control unit 160 decides whether the provisional result of arithmetic operations which is the result of arithmetic operation which is obtained before the user changes the arithmetic operation setting to be used coincides with the edited result of arithmetic operations that the user inputs.

In a case where the control unit 160 decides that the provisional result of arithmetic operations coincides with the edited result of arithmetic operations that the user inputs, the control unit 160 changes the arithmetic operating setting to be used as for the arithmetic operation setting which pertains to the multiplication omission and, then recalculates the numerical formula and decides whether a result of recalculation coincides with the edited value that the user inputs. In a case where the result of recalculation does not coincide with the edited value that the user inputs, the control unit 160 makes the display unit 130 display a notification that an error occurs.

Since, in the example in FIG. 5, the multiplication omission is contained in the numerical formula (1), the control unit 160 changes the arithmetic operation setting to be used and performs recalculation which is based on the arithmetic operation setting to be used which is changed. In the arithmetic operation setting which pertains to the multiplication omission, since a result of recalculation which is obtained in a case where the arithmetic operation setting to be used is changed from the arithmetic operation setting (A) to the arithmetic operation setting (B) is "9" and this result of recalculation "9" coincides with "9" which is the edited value that the user inputs, the control unit 160 decides that the result of recalculation coincides with the edited value that the user inputs.

In a case where the control unit 160 decides that the result of recalculation coincides with the edited value that the user inputs, the control unit 160 sets the arithmetic setting which is used in recalculation as a change candidate for the arithmetic operation setting to be used and makes the display unit 130 display a notification for confirming with the user about whether it is permitted to change the arithmetic operation setting to be used to the arithmetic operation setting which is used in recalculation.

FIG. 6 is a diagram illustrating one example of a message which is displayed on the display unit 130 in order to confirm with the user about whether it is permitted to change the arithmetic operation setting to be used which is displayed on the display unit 130. As illustrated in FIG. 6, the control unit 160 makes the display unit 130 display the message for confirming with the user about whether it is permitted to change the arithmetic operation setting to be used as for the arithmetic operation setting which pertains to the calculation omission.

In response to the message which is displayed on the display unit 130 in order to confirm with the user about whether it is permitted to change the arithmetic operation setting to be used, the user operates the input unit 120 and performs an input operation as to whether user permits to change the arithmetic operating setting to be used.

The control unit 160 decides whether permission for change of the arithmetic operation setting to be used is input from the user. In a case where the permission for change of the arithmetic operation setting to be used is input from the user, the control unit 160 changes the arithmetic operation setting to be used in accordance with the permission, makes the storage unit 150 store that the arithmetic operation setting to be used is changed and makes the display unit 130 display a notification for indicating that the arithmetic operation setting to be used is changed. The control unit 160 changes the arithmetic operation setting to be used and thereby modifies the arithmetic operation program.

In a case where a response that the user does not permit to change the arithmetic operation setting to be used is input from the user, the control unit 160 does not change the arithmetic operation setting to be used and terminates execution of arithmetic operation program setting processing.

Figure 7:
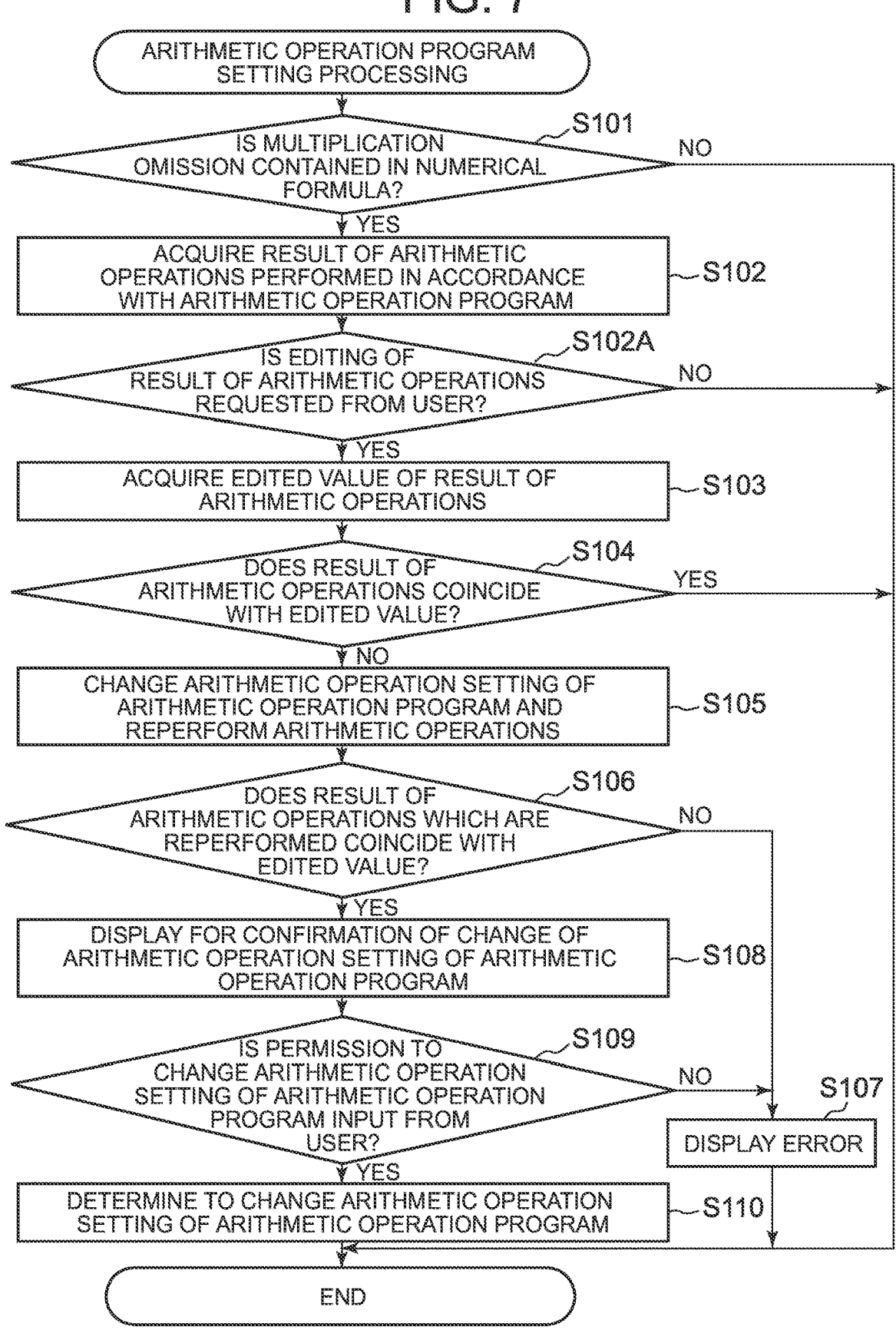
FIG. 7 is a flowchart illustrating one example of arithmetic operation program setting processing that a control unit in the information processing device according to the first embodiment executes.

FIG. 7 is a flowchart illustrating one example of the arithmetic operation program setting processing that the control unit 160 in the information processing device 1 according to the first embodiment executes. An arithmetic operation program setting change procedure will be described with reference to the flowchart in FIG. 7.

In a case where execution of the arithmetic operation program setting processing is started, the control unit 160 parses the numerical formula which is input from the user via the input unit 120 and decides whether the multiplication omission is contained in the numerical formula (step S101). In a case where the multiplication omission is not contained in the numerical formula (step S101: NO), the control unit 160 terminates execution of the arithmetic operation program setting processing.

In a case where the multiplication omission is contained in the numerical formula (step S101: YES), the control unit 160 arithmetically operates the numerical formula in accordance with the arithmetic operation program and acquires the result of arithmetic operations which are performed on the numerical formula in accordance with the arithmetic operation program (step S102).

After acquisition of the result of arithmetic operations which are performed on the numerical formula in accordance with the arithmetic operation program, the control unit 160 decides whether editing of the result of arithmetic operations is requested from the user (step S102A). In a case where no request is made (step S102A: NO), the control unit 160 terminates execution of the arithmetic operation program setting processing.

In a case where editing of the result of arithmetic operations is requested from the user (step S102A: YES), the control unit 160 acquires the edited value of the result of the arithmetic operations which are performed on the numerical formula which is input from the user via the input unit 120 (step S103).

After acquisition of the edited value of the result of arithmetic operations, the control unit 160 decides whether the result of arithmetic operations which are performed on the numerical formula in accordance with the arithmetic operation program coincides with the edited value (step S104). In a case where the result of arithmetic operations coincides with the edited value (step S104: YES), the control unit 160 terminates execution of the arithmetic operation program setting processing.

In a case where the result of arithmetic operations does not coincide with the edited value (step S104: NO), the control unit 160 changes the arithmetic operating setting of the arithmetic operation program which pertains to the multiplication omission and reperforms the arithmetic operations (step S105). That is, as described above, the control unit 160 changes (switches over) the arithmetic operation setting to be used between the arithmetic operation setting A and the arithmetic operation setting B.

After reperformance of the arithmetic operations, the control unit 160 decides whether a result of arithmetic operations which are reperformed coincides with the edited value that the user inputs (step S106).

In a case where the result of arithmetic operations which are reperformed does not coincide with the edited value (step S106: NO), the control unit 160 makes the display unit 130 display the notification that the error occurs (step S107) and terminates execution of the arithmetic operation program setting processing.

In a case where the result of arithmetic operations which are reperformed coincides with the edited value (step S106: YES), the control unit 160 sets the arithmetic operation setting which is used in recalculation as the change candidate for the arithmetic operation setting of the arithmetic operation program and makes the display unit 130 display the message for confirming with the user about whether it is permitted to change the arithmetic operation setting in the arithmetic operation program (step S108).

After making the display unit 130 display the message for confirming with the user about whether it is permitted to change the arithmetic operation setting of the arithmetic operation program, the control unit 160 decides whether permission for change of the arithmetic operation setting of the arithmetic operation program is input from the user (step S109).

In a case where the permission for change of the arithmetic operation setting of the arithmetic operation program is not input from the user (step S109: NO), the control unit 160 executes the process in step S107 and terminates execution of the arithmetic operation program setting processing.

In a case where the permission for change of the arithmetic operation setting of the arithmetic operation program is input from the user (step S109: YES), the control unit 160 determines to change the arithmetic operation setting of the arithmetic operation program, makes the storage unit 150 store that the arithmetic operation setting of the arithmetic operation program is changed (step S110) and terminates execution of the arithmetic operation program setting processing.

The control unit 160 decides whether it is preferable to modify the arithmetic operation program in step S102A, step S104, step S106 and step S109.

It becomes possible for the information processing device 1 according to the first embodiment to acquire the result of arithmetic operations that the target person intends to obtain with ease owing to provision of the above configuration and execution of the arithmetic operation program setting processing.

In a case where the result of arithmetic operations which are performed on the numerical formula by the scientific electronic calculator does not follow the user's intension and a cause therefor lies in the arithmetic operation setting of the scientific electronic calculator, it would be difficult and complicated to find one setting which is different from a setting that the user expects out of many arithmetic operation settings and to change the setting to the setting that the user expects. In the information processing device 1 according to the first embodiment, it becomes possible to perform setting of the arithmetic operation program by performing such an intuitive operation that the user edits the result arithmetic operations that the information processing device 1 derives.

For example, in a situation where students use the information processing devices 1 simultaneously during class, the teacher presents an exercise and an answer thereof to the students and makes the students input an exercise and an answer thereto into their information processing devices 1 and thereby it becomes possible to set the arithmetic operation program in the information processing devices 1 of all the students with ease. In this case, it becomes possible for each student to change the setting with ease without being aware of the presence of the setting.

In addition, in the information processing device 1 according to the first embodiment, the arithmetic operation program is modified by reperforming the arithmetic operations by changing the arithmetic operation setting and then by selecting one setting that the result of arithmetic operations that the user edits coincides with the result of arithmetic operations which are reperformed, and thereby it becomes possible to obtain the result of arithmetic operations that the user intends to obtain.

In addition, in the information processing device 1 according to the first embodiment, in a case where the multiplication omission is contained in the numerical formula, the arithmetic operation program is modified by making the switch as to whether the multiplication that the multiplication sign is omitted is performed preferentially to the multiplication and division that the multiplication sign is not omitted in the numerical formula and thereby it becomes possible to modify with ease the arithmetic operation program which pertains to the numerical formula which contains the multiplication omission which readily brings out the result of arithmetic operations that the user does not intend to obtain and to avoid modification of the arithmetic operation program that the user does not wish.

In addition, in the information processing device 1 according to the first embodiment, in a case where it is decided whether it is preferable to modify the arithmetic operation program and then is decided that it is preferable to modify the arithmetic operation program, the arithmetic operation program is actually modified and thereby it becomes possible to modify the arithmetic operation program in such a manner that the result of arithmetic operations that the user wishes to obtain is surely brought out and it also becomes possible to avoid change of the arithmetic operation setting that the user does not wish.

Although, in the first embodiment, it is described that the numerical formula is input, the provisional result of arithmetic operations is brought out, the input operation for requesting to edit the result of arithmetic operations is performed by the user and thereby the provisional result of arithmetic operations is edited, the present invention is not limited to the above. As an alternative, after the input operation for requesting to edit the result of arithmetic operations is performed by the user, the numerical formula and an answer to the numerical formula which corresponds to the edited result of arithmetic operations may be input, and then the control unit 160 may arithmetically operate the numerical formula so as to bring out the provisional result of arithmetic operations and then may modify the arithmetic operation program on the basis of the provisional result of arithmetic operations which is brought out and the edited result of arithmetic operations which is input.

Second Embodiment

The information processing device 1 according to the second embodiment will be described with reference to the drawings. The configuration of the information processing device 1 according to the second embodiment is the same as the configuration of the information processing device 1 according to the first embodiment (see FIG. 1 and FIG. 2).

The control unit 160 in the information processing device 1 according to the second embodiment executes each of the plurality of arithmetic operation programs which is stored in the storage unit 150 and thereby carrying out processing of performing the Four arithmetic operations and the functional calculations in accordance with the input signal which is transmitted from the input unit 120 and displaying the numerical value, the numerical formula and the results of calculation of the numerical formula which are input from the user on the display unit 130.

In a case where the control unit 160 decides that there exists a plurality of calculation results depending on arithmetic operation settings which pertain to the plurality of arithmetic operation programs as for the numerical formula that the user inputs, the control unit 160 makes the display unit 130 display a notification for presenting the arithmetic operation settings which are used in the respective calculations and respective calculation results which are obtained in a case where the respective arithmetic operation settings are used in respective calculations to the user.

Description will be made by giving a case where the user inputs the numerical formula (1) in FIG. 3 in the first embodiment, that is, 6÷2(1+2) by way of example. In a case where the user inputs the numerical formula (1), since there exists the plurality of calculation results for the numerical formula (1) depending on which arithmetic operation setting is used between the arithmetic settings (A) and (B), that is, (A) the priority of arithmetic operations which are performed on the multiplication that the multiplication sign is omitted is set higher than the priority of arithmetic operations which are performed on multiplication and division and (B) the priority of arithmetic operations which are performed on the multiplication that the multiplication sign is omitted is made equivalent to the priority order of arithmetic operations which are performed on the multiplication and division, the control unit 160 makes the display unit 130 display the arithmetic operation settings and the calculation results.

FIG. 8 is a diagram illustrating one example of the arithmetic operation settings and the calculation results which are displayed on the display unit 130. As illustrated in FIG. 8, the control unit 160 makes the display unit 130 display "Multiplication Omission: Preferential" and "Multiplication Omission: Equivalent" which are the arithmetic operation settings which are used in the calculations and "Ans=1" and "Ans=9" which are respective calculation results which are obtained in a case where the respective arithmetic operation settings are used. Incidentally, the arithmetic operation setting (A) and the calculation result thereof are displayed in correspondence with "1" and the arithmetic operation setting (B) and the calculation result thereof are displayed in correspondence with "2" in conformity with keys that the input unit 120 includes.

The user selects either the arithmetic operation setting (A) or the arithmetic operation setting (B) by operating the key which is displayed as "1" or the key which is displayed as "2" on the input unit 120 in accordance with the arithmetic operation settings and the calculation results thereof which are displayed on the display unit 130. The input unit 120 transmits a signal which indicates the arithmetic operation setting which is selected by the user to the control unit 160. The control unit 160 controls the display unit 130 and makes the display unit 130 display a notification for confirming with the user about whether it is permitted to save the selected arithmetic operation setting as the arithmetic operation setting to be used.

The user operates the input unit 120 in accordance with the notification for confirming with the user about whether it is permitted to save the arithmetic operation setting which is displayed on the display unit 130 as the arithmetic operation setting to be used and inputs a response to confirmation about whether it is permitted to save the arithmetic operation setting to be used.

The control unit 160 decides whether permission to save the arithmetic operation setting to be used is input from the user. In a case where the permission to save the arithmetic operation setting to be used is input from the user, the control unit 160 saves the arithmetic operation setting to be used in accordance with the permission, makes the storage unit 150 store that the arithmetic operation setting to be used is saved (an arithmetic operation setting save successful flag which will be described later) and makes the display unit 130 display a notification for indicating that the arithmetic operation setting to be used is saved.

In a case where the response that the user does not permit to save the arithmetic operation setting to be used is input, the control unit 160 terminates execution of the process concerned without saving the arithmetic operation setting to be used.

As another example, a case where the user inputs the following formula (2) will be described.

$$\sin(30) \qquad\qquad (2)$$

For the formula (2), since there exists a plurality of calculation results depending on which unit is used among "degree", "radian" and "grade" as the unit of angle, the control unit 160 makes the display unit 130 display arithmetic operation settings and calculation results.

FIG. 9 is a diagram illustrating one example of the arithmetic operation settings and the calculation results which are displayed on the display unit 130. As illustrated in FIG. 9, the control unit 160 makes the display unit 130 display "Angle: Degree Measure", "Angle: Circular Measure" and "Angle: Grade" which are the arithmetic operation settings which are used in the calculations and "Ans=0.5", "Ans=−0.98" and "Ans=0.45" which are the calculation results obtained in a case where the respective arithmetic operation settings are used.

The user operates the key which is numbered "1", the key which is numbered "2" or the key which is numbered "3" on the input unit 120 in accordance with the arithmetic operation settings and the calculation results which are displayed on the display unit 130. Subsequent processes are the same as the processes in the example of the formula (1).

In a case where saving of the arithmetic operation setting to be used is completed as described above, the control unit 160 sets the arithmetic operation setting save successful flag to "1" in order to indicate completion of saving of the arithmetic operation setting to be used and makes the storage unit 150 store "1". In a case where the arithmetic operation setting save successful flag which is stored in the storage unit 150 is "1", even in a case where it is decided that there exists the plurality of calculation results depending on the plurality of arithmetic operation settings for the numerical formula that the user inputs, the control unit 160 does not make the display unit 130 display settings which are used in such calculations as those which are illustrated in FIG. 8 and FIG. 9 and respective calculation results which are obtained in a case where these settings are used in the calculations.

In a case where the user performs an operation for selecting one arithmetic operation setting or an operation for restoring all the arithmetic operation settings in the information processing device 1 to initial states at the time of shipment from the factory, the control unit 160 resets the arithmetic operation setting save successful flag to "0" and makes the storage unit 150 store "0". Owing to execution of this process, it becomes possible to perform displays for encouraging the user to select the arithmetic operation setting again. Incidentally, as the arithmetic operation setting save successful flags, a first arithmetic operation setting save successful flag F_CSDONE 1 which pertains to the numerical formula which contains the multiplication omission and a second arithmetic operation setting save successful flag F_CSDONE 2 which pertains to the numerical formula which contains the trigonometric function are set.

Figure 10:
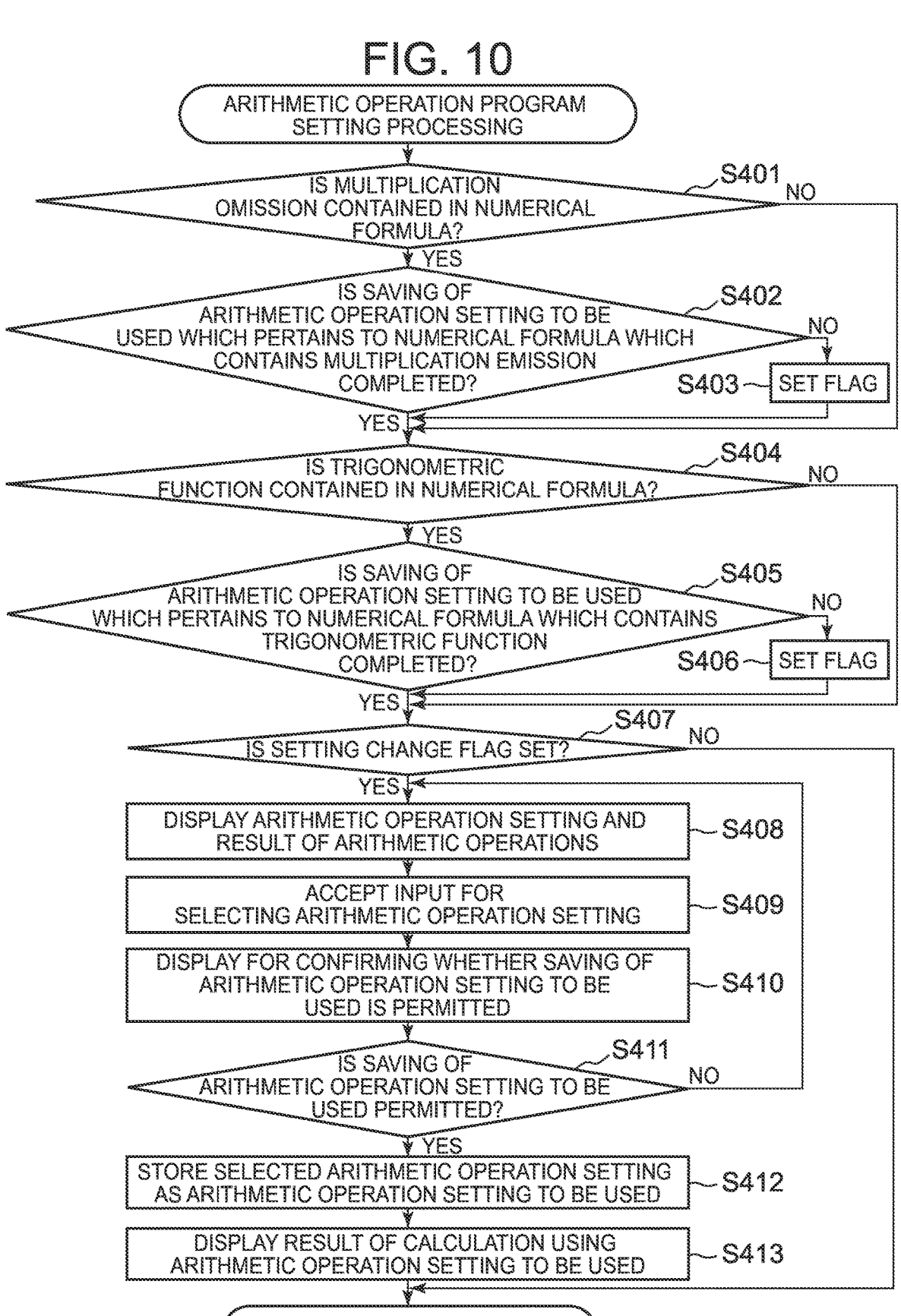
FIG. 10 is a flowchart illustrating one example of arithmetic operation program setting processing that a control unit in an information processing device according to the second embodiment executes.

FIG. 10 is a flowchart illustrating one example of arithmetic operation program setting processing that the control unit 160 in the information processing device 1 according to the second embodiment executes. The arithmetic operation program setting processing will be described with reference to the flowchart in FIG. 10.

In a case where execution of the arithmetic operation program setting processing is started, the control unit 160 parses the numerical formula which is input from the user via the input unit 120 and decides whether the multiplication omission is contained in the numerical formula (step S401). In a case where the multiplication omission is not contained in the numerical formula (step S401: NO), the control unit 160 proceeds to step S404.

In a case where the multiplication omission is contained in the numerical formula (step S401: YES), the control unit 160 decides whether the first arithmetic operation setting save successful flag F_CSDONE 1 is "1", that is, whether saving of the arithmetic operation setting to be used which pertains to the numerical formula which contains the multiplication omission is completed (step S402). In a case where saving of the arithmetic operation setting to be used which pertains to the numerical formula which contains the multiplication omission is completed (step S402: YES), the control unit 160 proceeds to step S404.

On the other hand, in a case where saving of the arithmetic operation setting to be used which pertains to the numerical formula which contains the multiplication omission is not completed (step S402: NO), the control unit 160 sets a setting change selection flag (step S403) and proceeds to step S404.

In step S404, the control unit 160 decides whether the trigonometric function is contained in the numerical formula which is input. In a case where the trigonometric function is not contained in the numerical formula (step S404: NO), the control unit 160 proceeds to step S407.

In a case where the trigonometric function is contained in the numerical formula (step S404: YES), the control unit 160 decides whether the second arithmetic operation setting save successful flag F_CSDONE 2 is "1", that is, whether saving of the arithmetic operation setting to be used which pertains to the numerical formula which contains the trigonometric function is completed (step S405). In a case where saving of the arithmetic operation setting to be used which pertains to the numerical formula which contains the trigonometric function is completed (step S405: YES), the control unit 160 proceeds to step S407.

On the other hand, in a case where saving of the arithmetic operation setting to be used which pertains to the numerical formula which contains the trigonometric function is not completed (step S405: NO), the control unit 160 sets the setting change selection flag (step S406) and proceeds to step S407.

The control unit 160 decides whether the setting change selection flag is set (step S407). In a case where it is decided that the setting change selection flag is not set (step S407: NO), the control unit 160 terminates execution of the arithmetic operation program setting processing.

In a case where it is decided that the setting change selection flag is set (step S407: YES), the control unit 160 calculates the input numerical formula by using the respective arithmetic operation settings and makes the display unit 130 display the arithmetic operation settings and the results of calculations (step S408) as previously described with reference to FIG. 8 and FIG. 9.

After making the display unit 130 display the arithmetic operation settings and the results of calculations, the control unit 160 accepts an input operation which is performed by the user for selection of the arithmetic operation setting via the input unit 120 (step S409).

After acceptance of the input operation for selection of the arithmetic operation setting, the control unit 160 makes the display unit 130 display a notification for confirming with the user about whether it is permitted to save the selected arithmetic operation setting as the arithmetic operation setting to be used (step S410).

After making the display unit 130 display the notification for confirming with the user about whether the it is permitted to save the arithmetic operation setting to be used, the control unit 160 accepts an input operation which is performed by the user for permission of saving of the arithmetic operation setting to be used via the input unit 120 and decides whether saving of the arithmetic operation setting to be used is permitted by the user (step S411). In a case where saving of the arithmetic operation setting to be used is not permitted by the user (step S411: NO), the control unit 160 returns to step S408.

In a case where saving of the arithmetic operation setting to be used is permitted by the user (step S411: YES), the control unit 160 makes the storage unit 150 store the selected arithmetic operation setting as the arithmetic operation setting to be used (step S412) and sets the flag which corresponds to the arithmetic operation setting to be used whose saving is permitted in step S411 to "1" in the first and second arithmetic operation setting save successful flags F_CSDONE 1 and F_CSDONE 2 and makes the storage unit 150 store "1".

After making the storage unit 150 store the selected arithmetic operation setting to be used, the control unit 160 makes the display unit 130 display the result of calculation which is performed by using the selected arithmetic operation setting to be used (step S413) and terminates execution of the arithmetic operation program setting processing.

In step S401 and step S404, the control unit 160 decides whether a condition that input data which is input from the user is specific data which pertains to a specific numerical formula is established and decides whether other predetermined conditions are established in step S402, step S405, step S407 and step S411.

The information processing device 1 according to the second embodiment exhibits effects which are the same as the effects that the information processing device 1 according to the first embodiment exhibits owing to provision of the above configuration and execution of the arithmetic operation program setting processing.

In the information processing device 1 according to the second embodiment, in a case where the input data which pertains to the numerical formula which is input from the user is specific data which contains, for example, the multiplication omission or the trigonometric function and there exists the plurality of calculation results depending on the settings, an inquiry is made at the user by displaying the settings and the calculation results and the calculation result concerned is displayed by changing the setting in accordance with the response from the user. Thereby, even in a case where the user does not know presence of the settings or the user is not aware of the presence of the settings, it becomes possible to avoid presentation of a calculation result that the user does not wish to have and to present a calculation result that the user wishes to have.

Third Embodiment

Next, an information processing device 2 according to the third embodiment of the present invention will be described with reference to the drawings. The information processing device 2 according to the third embodiment communicates with a terminal 3, the answer to the problem which is expressed by the numerical formula is input from the user into the information processing device 2 via the terminal 3, then the information processing device 2 grades the answer which is input from the user and sends a result of grading back to the terminal 3.

Figure 11:
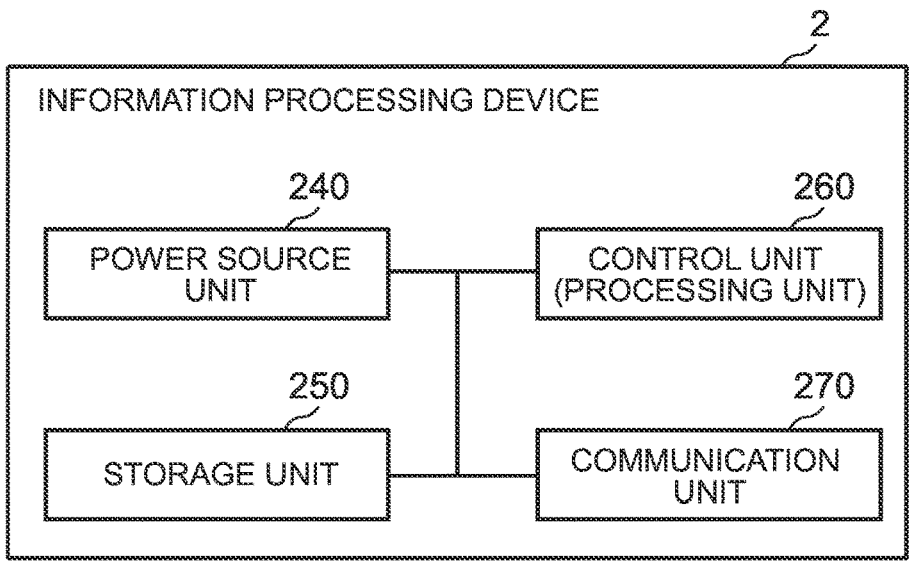
FIG. 11 is a block diagram illustrating one example of a configuration of an information processing device according to a third embodiment of the present invention.

FIG. 11 is a block diagram illustrating one example of a configuration of the information processing device 2 according to the third embodiment. As illustrated in FIG. 11, the information processing device 2 includes a power source unit 240, a storage unit 250, a control unit (a processing unit) 260 and a communication unit 270.

The power source unit 240 supplies the electric power to the storage unit 250, the control unit 260 and the communication unit 270. Although the power source unit 240 may include, for example, the primary battery, the secondary battery and a connector which is connected to an external power source, the present invention is not limited to the above.

battery and a connector which is connected to an external power source, the present invention is not limited to the above.

The storage unit 250 is a storage medium which stores a program that the control unit 260 executes or data which is used in the program, answer text data which contains the answer from the user to the problem which is expressed by the numerical formula, correct answer data which contains a correct answer to the problem, evaluation data on evaluation which is given to the answer from the user, the arithmetic operation program which is used for generation of the evaluation data, and setting data which contains the arithmetic operation settings which pertain to the arithmetic operation program. Although the storage unit 250 may include, for example, the ROM and the RAM, the present invention is not limited to the above.

The control unit 260 executes the program which is stored in the storage unit 250, and thereby controls the operation of the entire information processing device 2 and executes evaluation processing for evaluating the answer which is obtained from the user and arithmetic operation program setting processing for changing the arithmetic operation setting. Although the control unit 260 may include, for example, the CPU, the present invention is not limited to the above.

The communication unit 270 communicates with the terminal 3 and transmits and receives the answer text data, the evaluation data, the setting data and instruction data to and from the terminal 3. Although the communication unit 270 communicates with the terminal 3 over a network which includes, for example, the Internet, the present invention is not limited to the above.

Figure 12:
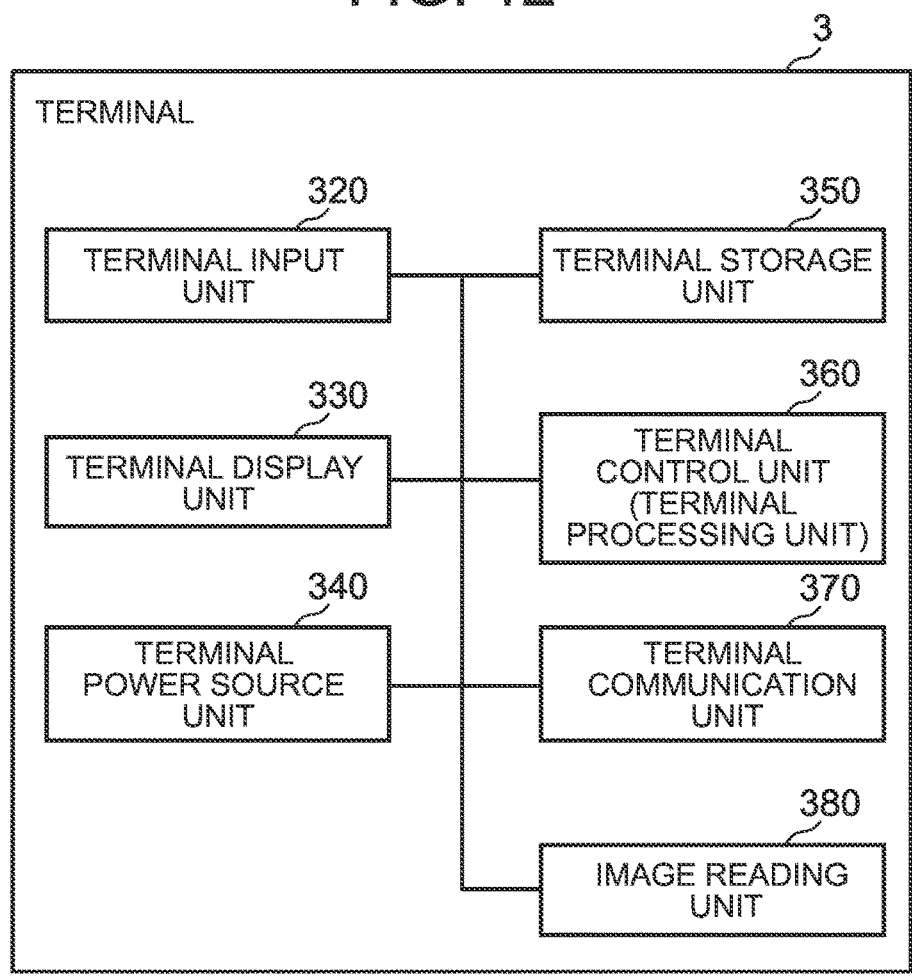
FIG. 12 is a block diagram illustrating one example of a configuration of a terminal in the third embodiment.

FIG. 12 is a block diagram illustrating one example of a configuration of the terminal 3 in the third embodiment. As illustrated in FIG. 12, the terminal 3 includes a terminal input unit 320, a terminal display unit 330, a terminal power source unit 340, a terminal storage unit 350, a terminal control unit (a terminal processing unit) 360, a terminal communication unit 370 and an image reading unit 380.

The terminal input unit 320 is a user interface which is operated by the user and thereby outputs a signal which indicates that it is operated by the user to the terminal control unit 360. Although the terminal input unit 320 may include, for example, a keyboard, a touch pad and a touch panel, the present invention is not limited to the above.

The terminal display unit 330 displays the answer which is input into the terminal 3 and a result of evaluation of the answer which is transmitted from the information processing device 2. Although the terminal display unit 330 may include, for example, the liquid crystal display, the present invention is not limited to the above.

The terminal power source unit 340 supplies the electric power to the terminal input unit 320, the terminal display unit 330, the terminal storage unit 350, the terminal control unit 360, the terminal communication unit 370 and the image reading unit 380. Although the terminal power source unit 340 may include, for example, the primary battery, the secondary battery and the connector which is connected to the external power source, the present invention is not limited to the above.

The terminal storage unit 350 is a storage medium which stores the program that the terminal control unit 360 executes and/or the data which is used in the program, image data and the text data on the answer to the problem which is expressed by the numerical formula. The terminal storage unit 350 may include, for example, the ROM and the RAM, the present invention is not limited to the above.

The terminal control unit 360 executes the program which is stored in the terminal storage unit 350 and thereby controls the operation of the entire terminal 3 and executes image processing for converting the image data on the answer that the user inputs into the text data. Although the terminal control unit 360 may include, for example, the CPU, the present invention is not limited to the above.

The terminal communication unit 370 communicates with the information processing device 2 and transmits and receives the answer text data, the evaluation data, the setting data and the instruction data to and from the information processing device 2. Although the terminal communication unit 370 communicates with the information processing device 2 over the network which includes, for example, the Internet, the present invention is not limited to the above.

The image reading unit 380 reads out the answer in the form of image data and transmits the read-out image data to the terminal control unit 360. Although the image reading unit 380 may include, for example, a camera and an image scanner, the present invention is not limited to the above.

Arithmetic operation program setting processing that the control unit 260 executes will be described. FIG. 13 is a diagram illustrating one example of a table of answers per answerer which is displayed on the terminal display unit 330 of the terminal 3. Description will be made by exemplifying a state where answerers A, B, C, D and E input "1.0", "1.00", "1.000", "1.0000" and "1.0000" as the answers respectively as illustrated in FIG. 13.

The terminal control unit 360 in the terminal 3 executes character/letter recognition processing on the image data which is transmitted from the image reading unit 380 and thereby converts the image data to the text data, and then makes the terminal storage unit 350 store answerer identification information and answers per problem.

The terminal control unit 360 transmits the text data on the answers and the instruction data for requesting to decide whether the answers are correct or incorrect, that is, requesting to evaluate the answers to the information processing device 2 via the terminal communication unit 370. Problem data which indicates the problem to which the user answers is contained in the instruction data. The problem is expressed by the numerical formula as previously described.

The control unit 260 in the information processing device 2 receives the text data on the answers and the instruction data for requesting to evaluate the answers from the terminal 3 via the communication unit 270 and then executes the evaluation processing for evaluating each answer by arithmetically operating the problem (the numerical formula) which is indicated in the problem data which is contained in the instruction data in accordance with the arithmetic operation program which is stored in the storage unit 250 and thereby deriving the correct answer data which indicates the correct answer of the problem which is expressed by the numerical formula, comparing the correct answer which is indicated in the derived correct answer data with each answer which is indicated in the text data on the answers and deciding whether each answer is correct or incorrect. Specifically, the control unit 260 decides whether each answer is correct or incorrect on the basis of a result of comparison between each answer which is indicated in the text data on the answers and the correct answer which is indicated in the correct answer data and thereby generates evaluation data. The correct answer data which is obtained before the user changes the arithmetic operation setting corresponds to the provisional arithmetic operation result data.

The control unit 260 parses the correct answer data which is the result of arithmetic operations which are performed on the numerical formula and decides whether decimals are contained in the result of arithmetic operations. In a case where no decimal is contained in the result of arithmetic operations, the control unit 260 terminates execution of the arithmetic operation program setting processing.

After evaluation of the answer that the user inputs by deciding whether the answer is correct or incorrect, the control unit 260 transmits evaluation data which indicates the result of evaluation to the terminal 3 via the communication unit 270.

The terminal control unit 360 of the terminal 3 receives the evaluation data and then makes the terminal display unit 330 display the result of evaluation on the basis of the evaluation data. FIG. 14 is a diagram illustrating one example of a table which is displayed on the terminal display unit 330 and indicates the answers and decisions on whether the answers are correct or incorrect per answerer. As illustrated in FIG. 14, in the evaluation data, all the answers "1.0", "1.00", "1.000", "1.0000" and "1.0000" of the answerers A, B, C, D and E are evaluated to be correct. That is, the correct answers which are indicated in the correct answer data in this case are "1.0", "1.00", "1.000", "1.0000" and "1.0000".

In a state where the table which indicates the answers and the decisions on whether the answers are correct or incorrect per answerer is being displayed on the terminal display unit 330, the user operates the terminal input unit 320 and inputs the answers correctness/incorrectness of which the user wishes to change and changed correctness/incorrectness of these answers as edited arithmetic operation result data, that is, as edited correct answer data which indicates the correct answer or the incorrect answer to the problem which is input from the user. The terminal input unit 320 transmits the edited arithmetic operation result data which is input to the terminal control unit 360. Then, the terminal control unit 360 controls the terminal display unit 330 and makes the display unit 130 display the edited arithmetic operation result data.

FIG. 15 is a diagram illustrating one example of a table which is displayed on the terminal display unit 330 and indicates the answers and edited correctness/incorrectness of the answers. In the example in FIG. 15, "1.000" and "1.0000" are input as answers the correctness/incorrectness of which the user wishes to edit and "Incorrect" is input as the edited correctness/incorrectness of these answers and the terminal control unit 360 controls the terminal display unit 330 and makes the terminal display unit 330 display the edited arithmetic operation result data that the user inputs.

The terminal control unit 360 transmits the instruction data for requesting to change the setting, the text data on the answers the correctness/incorrectness of which is to be changed and the evaluation data on the answers the correctness/incorrectness of which is changed to the information processing device 2 via the terminal communication unit 370.

The control unit 260 in the information processing device 2 decides whether the instruction data for requesting to change the setting, the text data on the answers the correctness/incorrectness of which is to be changed and the evaluation data on the answers the correctness/incorrectness of which is changed are received as the edited arithmetic operation result data from the terminal 3 via the communication unit 270.

The control unit 260 acquires the edited arithmetic operation result data that the user inputs by receiving from the terminal 3.

After acquisition of the edited arithmetic operation result data by receiving from the terminal 3, the control unit 260 parses the answers, counts the number of zero-padded digits per answer and modifies (changes) the arithmetic operation program in accordance with which the numerical problem which is expressed by the numerical formula is arithmetically operated such that the number of zero-padded digits of the correct answer which is indicated in the correct answer data coincides with the number of zero-padded digits of the answer which is input as the correct answer from the user on the basis of a result of counting of the number of zero-padded digits.

The control unit 260 counts the minimum number of zero-padded digits "n" of the answer which is the incorrect answer and modifies the arithmetic operation program in such a manner that data which contains the number of zero-padded digits which is more than "n" in the decimal part is decided as the incorrect answer. In the example in FIG. 15, "1.000" is the incorrect answer and therefore n=3.

The control unit 260 counts the maximum number of zero-padded digits "m" of the answer which is the correct answer and modifies the arithmetic operation program in such a manner that data which contains the number of zero-padded digits which is less than "m" in the decimal part is decided as the correct answer. In the example in FIG. 15, "1.00" is the correct answer and therefore m=2.

The control unit 260 reperforms the arithmetic operations in accordance with the arithmetic operation program for the arithmetic operation settings that the answer which is more than "n" in the number of zero-padded digits is defined as the incorrect answer and the answer which is less than "m" in the number of zero-padded digits is defined as the correct answer and decides whether the result of arithmetic operations which are reperformed coincides with the edited result of arithmetic operations which is indicated in the edited arithmetic operation result data which is acquired from the terminal 3. Specifically, the control unit 260 executes the evaluation processing on the basis of the correct answer data which is prepared by executing the modified arithmetic operation program and decides whether correctness/incorrectness which is obtained from a result of evaluation coincides with the changed correctness/incorrectness which is contained in the edited arithmetic operation result data in regard to each answer which is contained in the edited arithmetic operation result data and the correctness/incorrectness of which is wished to change. In a case where the result of arithmetic operations which are reperformed does not coincide with the edited result of arithmetic operations which is indicated in the edited arithmetic operation result data which is acquired from the terminal 3, the control unit 260 transmits data which indicates error occurrence to the terminal 3 via the communication unit 270.

After decision that the result of arithmetic operations which are reperformed coincides with the edited result of arithmetic operations which is indicated in the edited arithmetic operation result data, the control unit 260 transmits data for confirming with the user about whether it is permitted to change the arithmetic operation setting to the arithmetic operation setting which is used in reperformance of the arithmetic operations to the terminal 3 via the communication unit 270.

In a case where the control unit 360 of the terminal 3 receives the data for requesting the user to confirm whether it is permitted to change the arithmetic operation setting to the arithmetic operation setting which is used in reperformance of the arithmetic operations via the terminal communication unit 370, the control unit 360 makes the display unit 330 display a notification for confirming whether it is permitted to change the arithmetic operation setting.

The user operates the input unit 320 in accordance with the notification which is displayed on the display unit 330 for confirmation of whether it is permitted to change the arithmetic operation setting to be used and performs an input operation as to whether the user permits to change the arithmetic operation setting.

In a case where permission for change of the arithmetic operation setting is input from the user, the control unit 330 transmits data on permission for change of the arithmetic operation setting to the information processing device 2 via the terminal communication unit 370.

The control unit 260 in the information processing device 2 receives the data on permission for change of the arithmetic operation setting via the communication unit 270, then changes the arithmetic operation setting and makes the storage unit 250 store that the arithmetic operation setting is changed.

The control unit 260 modifies the arithmetic operation program so as to change the number of zero-padded digits of the decimal part of the correct answer data on the basis of the edited arithmetic operation result data which is input from the user and is received via the terminal 3.

The control unit 260 makes the storage unit 250 store the arithmetic operation program that the answer which is more than "n" in the number of zero-padded digits is defined as the incorrect answer and the answer which is less than "m" in the number of zero-padded digits is defined as the correct answer and then transmits data which indicates that the arithmetic operation program is modified to the terminal 3 via the communication unit 270.

The terminal control unit 360 in the terminal 3 receives the data which indicates that the arithmetic operation program is modified via the terminal communication unit 370 and then makes the terminal display unit 330 display a notification which indicates that the arithmetic operation setting is changed.

The control unit 260 executes again the evaluation processing in a state where the arithmetic operation program is modified and then outputs evaluation data which is different from the provisional result of arithmetic operations. FIG. 16 is a diagram illustrating one example of a table which is displayed on the terminal display unit 330 and indicates answers and correctness/incorrectness decisions which are made after change of the arithmetic operation setting per answerer. As illustrated inn FIG. 16, after change of the arithmetic operation setting, the control unit 260 decides that the answers of the answerers A and B that the number of zero-padded digits of the decimal part is "1" or "2" are correct answers and decides that the answers of the answerers C, D and E that the number of zero-padded digits of the decimal part is "3" or "4" are incorrect answers.

Figure 17:
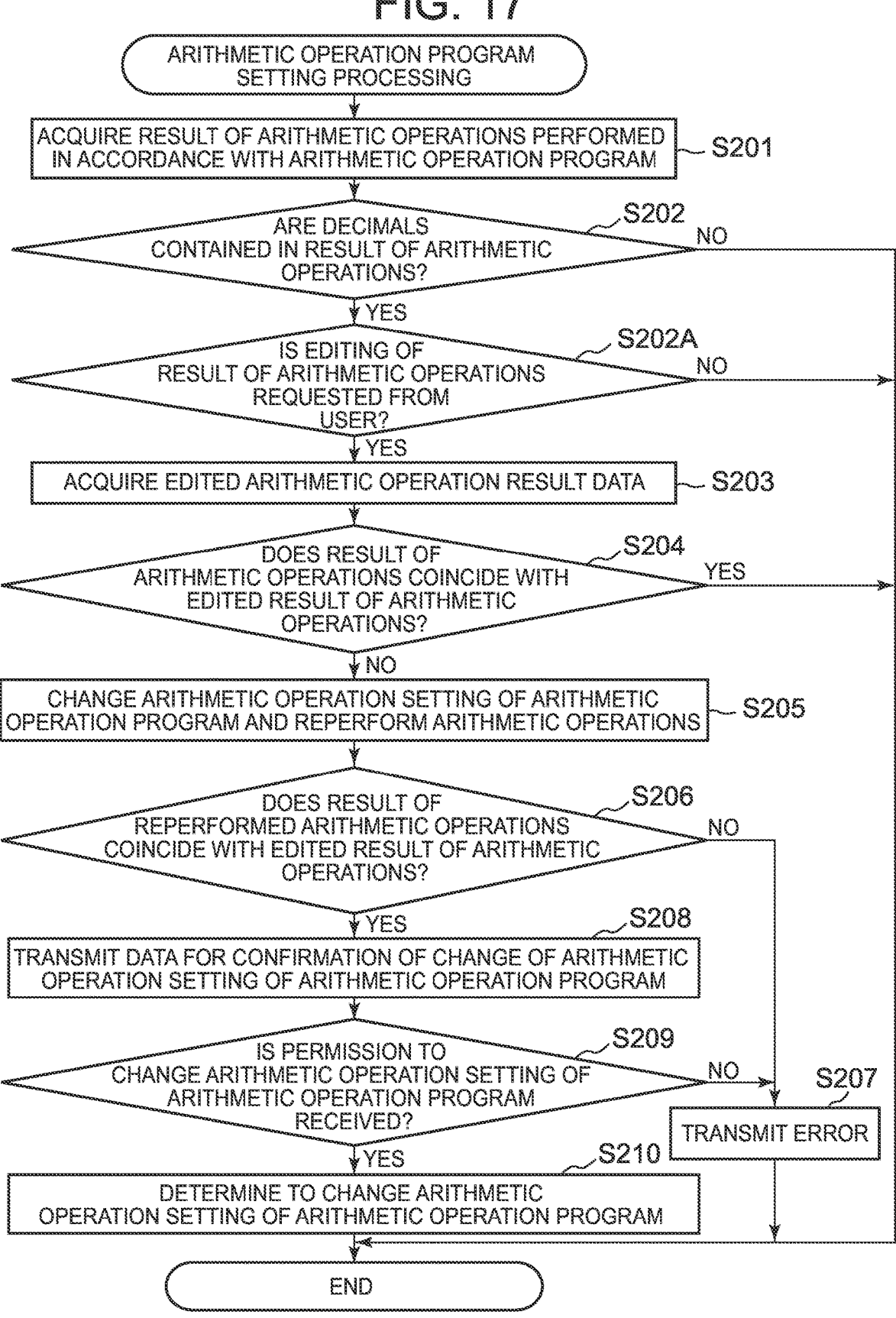
FIG. 17 is a flowchart illustrating one example of arithmetic operation program setting processing that a control unit in the information processing device according to the third embodiment executes.

FIG. 17 is a flowchart illustrating one example of arithmetic operation program setting processing that the control unit 260 in the information processing device 2 according to the third embodiment executes. The arithmetic operation program setting processing will be described with reference to the flowchart in FIG. 17.

In a case where execution of the arithmetic operation program setting processing is started, the control unit 260 arithmetically operates a numerical problem which is input from the user and is expressed by the numerical formula in accordance with the arithmetic operation program and acquires the result of arithmetic operations (correct answer data) which are performed in accordance with the arithmetic operation program (step S201).

After acquisition of the result of arithmetic operations, the control unit 260 parses the result of arithmetic operations and decides whether the decimal(s) is/are contained in the result of arithmetic operations (step S202). In a case where no decimal is contained in the result of arithmetic operations (step S202: NO), the control unit 260 terminates execution of the arithmetic operation program setting processing.

In a case where the decimal(s) is/are contained in the result of arithmetic operations (step S202: YES), the control unit 160 decides whether the request to edit the result of arithmetic operations is given from the user (step S202A). In a case where the request is not given (step S202A: NO), the control unit 160 terminates execution of the arithmetic operation program setting processing.

In a case where the request to edit the result of arithmetic operations is given from the user (step S202A: YES), the control unit 260 acquires the edited arithmetic operation result data from the terminal 3 via the communication unit 270 (step S203).

After acquisition of the edited arithmetic operation result data, the control unit 260 decides whether the result of the arithmetic operations which are performed on the numerical formula in accordance with the arithmetic operation program coincides with the edited result of arithmetic operations which is indicated in the edited arithmetic operation result data (step S204). Specifically, the control unit 260 executes the evaluation processing on the basis of the correct answer data which is prepared by execution of the arithmetic operation program and decides whether the correctness/incorrectness which is obtained from the result of evaluation of the arithmetic operations coincides with the changed correctness/incorrectness which is contained in the edited arithmetic operation result data in regard to each answer which is contained in the edited arithmetic operation result data and the correctness/incorrectness of which is wished to change. In a case where the result of arithmetic operations coincides with the edited value (the edited result of arithmetic operations) (step S204: YES), the control unit 260 terminates execution of the arithmetic operation program setting processing.

In a case where the result of arithmetic operations does not coincide with the edited value (step S204: NO), the control unit 260 changes the arithmetic operation setting of the arithmetic operation program and reperforms the arithmetic operations (step S205). Specifically, the control unit 260 counts the number of zero-padded digits of each answer, modifies (changes) the arithmetic operation program in accordance with which the numerical problem which is expressed by the numerical formula is arithmetically operated in such a manner that the number of zero-padded digits of the correct answer which is indicated in the correct answer data coincides with the number of zero-padded digits of the answer which is input from the user as the correct answer on the basis of a result of counting of the number of zero-padded digits and reperforms the arithmetic operations on the numerical formula by executing the modified arithmetic operation program.

After reperformance of arithmetic operations, the control unit 260 decides whether the result of arithmetic operations which are reperformed coincides with the edited result of arithmetic operations which is indicated in the edited arithmetic operation result data (step S206). Specifically, the control unit 260 executes the evaluation processing on the basis of the correct answer data which is prepared by executing the modified arithmetic operation program and decides whether the correctness/incorrectness which is obtained from the result of evaluation coincides with the changed correctness/incorrectness which is contained in the edited arithmetic operation result data in regard to each answer which is contained in the edited arithmetic operation result data and the correctness/incorrectness of which is wished to change.

In a case where the result of arithmetic operations which are reperformed does not coincide with the edited result of arithmetic operations which is indicated in the edited arithmetic operation result data (step S206: NO), the control unit 260 transmits data which indicates error occurrence to the terminal 3 via the communication unit 270 (step S207) and terminates execution of the arithmetic operation program setting processing.

In a case where the result of arithmetic operations which are reperformed coincides with the edited result of arithmetic operations which is indicated in the edited arithmetic operation result data (step S206: YES), the control unit 260 sets the arithmetic operation setting which is used in reperformance of the arithmetic operations as the change candidate for the arithmetic operation setting in the arithmetic operation program and transmits data for confirmation of change of the arithmetic operation setting in the arithmetic operation program to the user (step S208).

After transmission of the data for confirmation whether it is permitted to change the arithmetic operation setting in the arithmetic operation program, the control unit 260 decides whether permission for change of the arithmetic operation setting in the arithmetic operation program is received from the terminal 3 (step S209).

In a case where the permission for change of the arithmetic operation setting in the arithmetic operation program is not received (step S209: NO), the control unit 160 executes the process in step S207 and terminates execution of the arithmetic operation program setting processing.

In a case where the permission for change of the arithmetic operation setting in the arithmetic operation program is received (step S209: YES), the control unit 260 determines to change the arithmetic operation setting in the arithmetic operation program, makes the storage unit 250 store that the arithmetic operation setting in the arithmetic operation program is changed (step S210) and terminates execution of the arithmetic operation program setting processing.

The control unit 260 decides whether it is preferable to modify the arithmetic operation program in step S202A, step S204, step S206 and step S209.

It becomes possible for the information processing device 2 according to the third embodiment to acquire the result of arithmetic operations that a target person (the user) intends to obtain with ease owing to provision of the above configuration and execution of the arithmetic operation program setting processing.

In automatic grading, in a case where the answer that the user wishes to set as the correct answer is decided as the incorrect answer or the answer that the user wises to set as the incorrect answer is decided as the correct answer and the reason therefor lies in setting of the automatic grading, it would be difficult and complicated to change the setting by finding one setting which is different from the setting that the user assumes out of many settings. In the information processing device 2 according to the third embodiment, it becomes possible to change the setting of the information processing device 2 by performing such an intuitive operation that the user edits the result of arithmetic operations that the information processing device 2 derives.

It becomes possible for the information processing device 2 according to the third embodiment to obtain the result of arithmetic operations that the user intends to obtain by modifying the arithmetic operation program so as to change the number of zero-padded digits of the decimal part of the correct answer data on the basis of the edited arithmetic operation data which is acquired by analyzing the answer that the user edits and the provisional arithmetic operation result data which is obtained before the user changes the arithmetic operation setting to be used.

Incidentally, in the third embodiment, the correct answer data is acquired as the provisional arithmetic operation result data in the present invention by arithmetically operating the numerical problem which is expressed by the numerical formula in accordance with the arithmetic operation program. As an alternative, for example, the provisional arithmetic operation data may be acquired in the following manner. That is, as the provisional arithmetic operation result data, in the correct answer data on the problem which is expressed by the numerical formula, a plurality of pieces of candidate data for the correct answer data which is mutually different in the number of zero-padded digits of the decimals may be stored in advance in a storage medium such as the ROM and so forth in correspondence with the problem which is expressed by the numerical formula and at least one piece of data in the plurality of pieces of candidate data for the correct answer which is stored in the storage medium may be acquired by reading out of the storage medium as the provisional arithmetic operation result data.

In the above-mentioned case, the arithmetic operation program is modified in such a manner that in the plurality of pieces of candidate data which is stored in the above-mentioned manner, one piece of candidate data which contains the number of the zero-padded digits of the decimals which is the same as the number of zero-padded digits of the decimals of the answer which is contained in the edited arithmetic operation result data that the user edits is read out as the correct answer data. That is, the arithmetic operation program which is modified in this way is used to read out any one piece of the plurality of pieces of candidate data for the correct answer as the correct answer data. Such a variation of the present invention as above is useful in a case where the arithmetic operation program is configured to evaluate the answer which is obtained from the user on the basis of the correct answer data.

In addition, although, in the third embodiment, it is described that the control unit 260 acquires the edited result of arithmetic operations on the basis of the user's operation of inputting the correctness/incorrectness of the answer into the terminal 3, the present invention is not limited to the above. The edited arithmetic operation result data which is generated in advance in accordance with a study guideline (an education guideline that an educational institution such as, for example, the Ministry of Education and so forth sets) may be stored into the storage unit 250 and the control unit 260 may acquire the edited arithmetic operation result data which is stored in the storage unit 250 on the basis of the user's input operation. As an alternative, the edited arithmetic operation result data such as the above may be acquired from a server on the basis of the user's input operation.

Fourth Embodiment

The information processing device 2 according to the fourth embodiment of the present invention will be described with reference to the drawings. The configuration of the information processing device 2 according to the fourth embodiment is the same as the configuration of the information processing device 2 according to the third embodiment (see FIG. 11).

Correct answer data per problem, grade setting data which contains a grade setting which is used for scoring and grading per problem and answer data which contains answers which are graded are input into the terminal 3 which communicates with the information processing device 2 according to the fourth embodiment. In the fourth embodiment, the grade setting means a setting as to which answer is decided as the correct answer in a relation between the correct answer data and the answer data.

The terminal control unit 360 in the terminal 3 makes the terminal display unit 330 display a notification for making the user input the grade setting data and the answer data, a notification for indicating data names of the grade setting data and the answer data which are input and a notification for instructing to start grading.

FIG. 18 is a diagram illustrating one example of a screen that the grade setting data and the answer data which are displayed on the terminal display unit 330 in the terminal 3 are input. In the example in FIG. 18, "XX Mock Examination 2021 First Grade at Senior High School, json" is displayed as the grade setting data, "XX Mock Examination 2021 First Grade at Senior High School, csv" is displayed as the answer data that the user inputs, "Selection" buttons that the user clicks for data selection and a "Start Grading" button that the user clicks for instructing the information processing device 2 to start grading are displayed.

The terminal control unit 360 transmits the grade setting data and the answer data which are selected by the user to the information processing device 2 via the terminal communication unit 370.

The control unit 260 in the information processing device 2 parses the received grade setting data and answer data and decides whether there exists a problem that the decision as to whether the answer is correct or incorrect is changed depending on the grade setting data. For example, the control unit 260 decides whether there exists a numerical problem that there are cases where the zero-padded decimals after the decimal point are contained in the answer and therefore the answer becomes correct or incorrect depending on the number of zero-padded digits of the decimals after the decimal point and whether there exists a numerical problem that the answer becomes correct or incorrect depending on which one of the degree, the radian and the grade is used as the unit of angle. In the above-mentioned case, the control unit 260 decides whether the grade setting data is grade data which pertains to the grade setting of the numerical problem which contains the zero-padded decimals in the answer and is the first grade setting data that it is possible to change the number of zero-padded digits and decides whether the grade setting data is the grade data which pertains to the grade setting of the numerical problem which contains the trigonometric function and is the second grade setting data that it is possible to change which unit is used among the grade, the radian and the grade as the unit of angle of the trigonometric function on the basis of a result of parsing of the grade setting data and the answer data.

The control unit 260 transmits a notification for inquiring the user about whether it is preferable to modify (change) the grade setting data and about contents which are changed in association with data modification to the terminal 3 via the communication unit 270.

The terminal control unit 360 in the terminal 3 receives the notification for inquiring the user about whether it is preferable to modify (change) the grade setting data and about the contents which are changed in association with data modification from the information processing device 2 and then makes the terminal display unit 330 display a grade setting change screen which is illustrated in FIG. 19 and thereby makes the terminal display unit 330 display candidates for the contents which are changed in the grade setting data.

As illustrated in FIG. 19, a notification for inquiring the user about whether it is preferable to change a zero padding setting in the grade setting data, items "Zero Padding of All Decimals is Permitted", "Zero Padding Down to First Place After Decimal Point is Permitted" and "Zero Padding Down to Second Place After Decimal Point is Permitted" which are indicated as the change candidates for the grade setting data, check boxes that the user checks for selecting any one of these change candidates and a "Change" button that the user clicks for requesting the information processing device 2 to change the grade setting data depending on the selected change candidate are displayed on the terminal display unit 330. Likewise, a notification for inquiring the user about whether it is preferable to change the angle setting in the grade setting data, items "Degree Measure", "Circular Measure" and "Grade" which are indicated as change candidates for the grade setting data, a check box that the user checks for selecting any one of these change candidates, and a "Change" button that the user clicks for requesting the information processing device 2 to change the grade setting data depending on the selected change candidate are displayed on the terminal display unit 330.

The user selects and checks any one of the check boxes for the plurality of change candidates in the grade setting data via the terminal input unit 320, clicks the "Change" button and thereby requests the information processing device 2 to change the grade setting data which is used in grading in accordance with the changed contents which are selected by checking the check box concerned.

The terminal control unit 360 transmits the change candidate data which indicates the change candidate which is selected by the user in a state of being contained in the grade setting data as a user's reply to the inquiry at the user about whether it is preferable to modify (change) the grade setting data and about the contents which are changed in association with data modification to the information processing device 2 via the terminal communication unit 370.

The control unit 260 in the information processing device 2 executes grading processing on the basis of the grade setting data and the answer data which are received and transmits grading result data to the terminal 3 via the communication unit 270. In the grading processing, the control unit 260 compares the correct answer data and the answer data which are contained in the grade setting data with each other in accordance with a grade setting which is contained in the grade setting data which is received from the terminal 3 and performs grading on the basis of a result of comparison between the correct answer data and the answer data. In this situation, in a case where the change candidate data is contained in the grade setting data, the control unit 260 changes the grade setting data on the basis of the change candidate data, compares the correct answer data and the answer data which are contained in the grade setting data with each other in accordance with the grade setting which is contained in the changed grade setting data and performs the grading on the basis of the result of comparison between the correct answer data and the answer data.

The control unit 260 executes arithmetic operation processing of comparing the correct answer data with the answer data and performing the grading on the basis of the result of comparison between the correct answer data and the answer data and a program which is used for execution of this arithmetic operation processing functions as the arithmetic operation program. That is, to change the grade setting data corresponds to execute arithmetic operation program setting processing.

Figure 20:
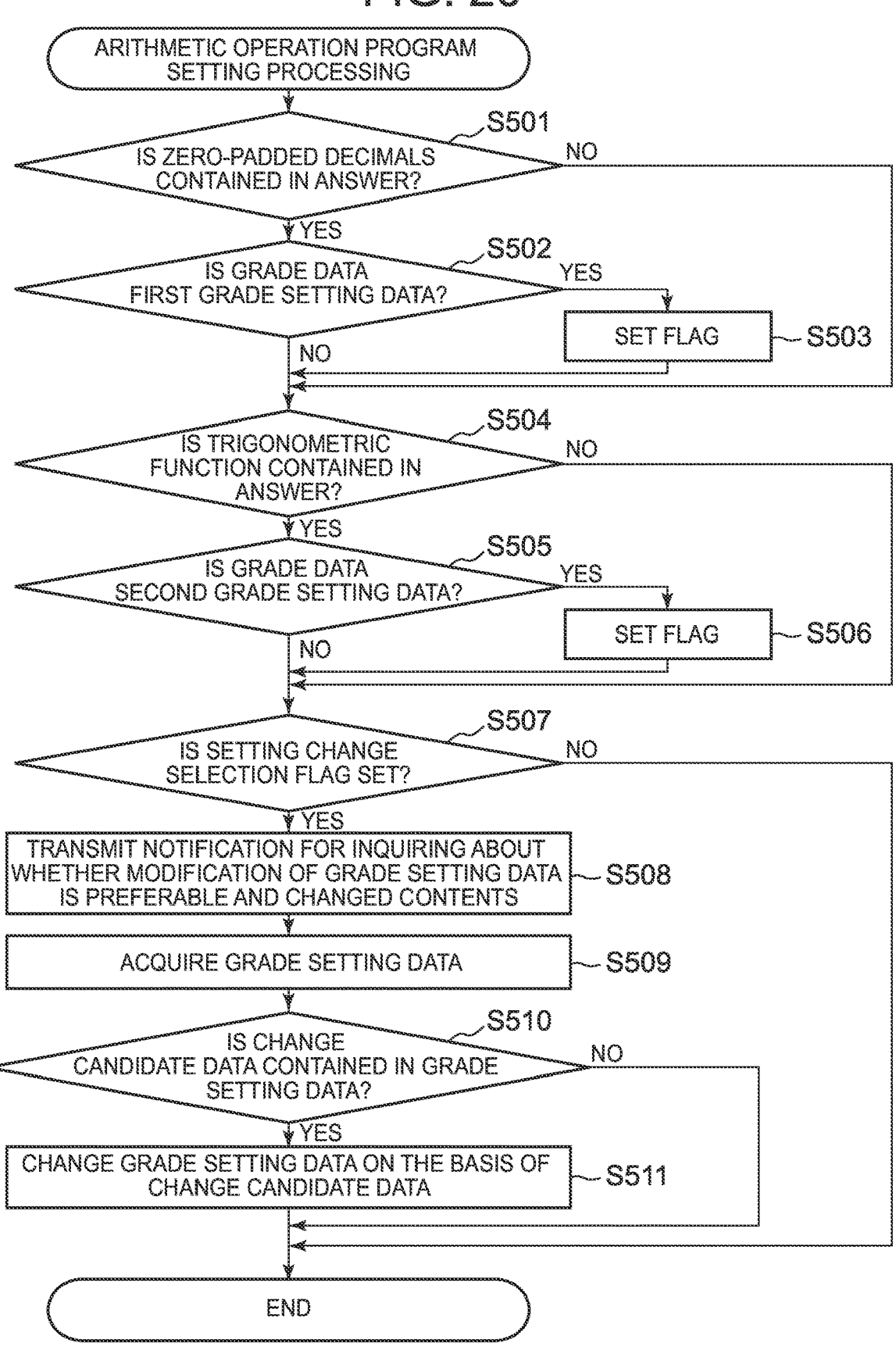
FIG. 20 is a flowchart illustrating one example of arithmetic operation program setting processing that a control unit in an information processing device according to the fourth embodiment executes.

FIG. 20 is a flowchart illustrating one example of the arithmetic operation program setting processing that the control unit 260 in the information processing device 2 according to the fourth embodiment executes. The arithmetic operation program setting processing will be described with reference to the flowchart in FIG. 20.

In a case where execution of the arithmetic operation program setting processing is started, the control unit 260 parses the grade setting data and the answer data which are transmitted from the terminal 3 and decides whether a zero-padded decimal(s) is/are contained in the answer in the answer data (step S501). In a case where the zero-padded decimal is not contained in the answer (step S501: NO), the control unit 260 proceeds to step S504.

In a case where the zero-padded decimal(s) is/are contained in the answer (step S501: YES), the control device 260 decides whether the grade setting data is the above-described first grade setting data (step S502). In a case where the grade setting data is not the first grade setting data (step S502: NO), the control unit 260 proceeds to step S504.

In a case where the grade setting data is the first grade setting data (step S502: YES), the control unit 260 sets a setting change selectin flag (step S503) and proceeds to step S504.

The control unit 260 decides whether the trigonometric function is contained in the answer in the answer data (step S504). In a case where the trigonometric function is not contained in the answer (step S504: NO), the control unit 260 proceeds to step S507.

In a case where the trigonometric function is contained in the answer (step S504: YES), the control unit 260 decides whether the grade setting data is the above-described second grade setting data (step S505). In a case where the grade setting data is not the second grade setting data (step S505: NO), the control unit 260 proceeds to step S507, In a case where the grade setting data is the second grade setting data (step S505: YES), the control unit 260 sets the setting change selection flag (step S506) and proceeds to step S507.

The control unit 260 decides whether the setting change selection flag is set (step S507). In a case where the control unit 260 decides that the setting change selection flag is not set (step S507: NO), the control unit 260 terminates execution of the arithmetic operation program setting processing.

In a case where the control unit 260 decides that the setting change selection flag is set (step S507: YES), the control unit 260 transmits a direction for inquiring the user about whether it is preferable to modify (change) the grade setting data and about the contents which are changed in association with the data modification to the terminal 3 via the communication unit 270 (step S508).

After transmission of the direction for inquiring the user about whether it is preferable to modify (change) the grade setting data and about the contents which are changed in association with the data modification, the control unit 260 acquires the grade setting data from the terminal 3 via the communication unit 270 (step S509).

After acquisition of the grade setting data, the control unit 260 decides whether the change candidate data is contained in the grade setting data (step S510). In a case where the control unit 260 decides that the change candidate data is not contained in the grade setting data (step S510: NO), the control unit 260 terminates execution of the arithmetic operation program setting processing.

In a case where the control unit 260 decides that the change candidate data is contained in the grade setting data (step S510: YES), the control unit 260 changes the grade setting data on the basis of the change candidate data (step S511) and terminates execution of the arithmetic operation program setting processing.

The control unit 260 decides whether a condition that the input data which is input from the user is specific data which pertains to the specific numerical formula is established in step S501, step S502, step S504 and step S505 and decides whether other predetermined conditions are established in step S507 and step S510.

The information processing device 2 according to the fourth embodiment exhibits effects which are the same as the effects that the information processing device 2 according to the third embodiment exhibits owing to provision of the above configuration and execution of the arithmetic operation program setting processing.

In a case where the input data which pertains to the numerical formula which is input from the user is specific data such as, for example, the data which contains the trigonometric function or the decimals and there exists a plurality of grading results depending on the grade setting data, even in a case where the user does not know that it is possible to change the grade setting data, it becomes possible for the information processing device 2 according to the fourth embodiment to avoid provision of a result of grading that the user does not wish to obtain and to provide a result of grading that the user wishes to obtain by inquiring the user about the user's intension by making the terminal display unit 330 of the terminal 3 display the setting change screen, then by changing the setting in accordance with a response from the user and thereby by grading the answer that the user inputs.

Incidentally, although it is described that the grade setting data which contains the grade settings which are used for scoring and grading per problem is input into the terminal 3, the present invention is not limited to the above. As an alternative, the storage unit 250 of the information processing device 2 may store a plurality of pieces of grade setting data and the terminal 3 may accept an input operation for selection as to which grade setting data is used. The terminal 3 may accept an input operation for requesting the setting to be changed to the information processing device 2. In this case, only the answer data is parsed by the information processing device 2.

Although it is described that the terminal control unit 360 in the terminal 3 operates to contain the change candidate data which indicates the change candidate which is selected by the user in the grade setting data and to transmit the grade setting data to the information processing device 2 via the terminal communication unit 370, the present invention is not limited to the above. The terminal control unit 360 in the terminal 3 may change the grade setting data on the basis of the change candidate data and may transmit the changed grade setting data to the information processing device 2 via the terminal communication unit 370. That is, the terminal 3 may be included in the information processing device 2 and may function as part of the information processing device 2.

Modified Examples

Although the embodiments of the present invention are described above, the embodiments are merely examples and the scope of the present invention is not limited to these embodiments. That is, the embodiments of the present invention are applicable in a variety of ways and all embodiments are contained in the scope of the present invention.

Although it is described that the information processing device 1 according to the first embodiment is the scientific electronic calculator, the present invention is not limited to the above. The information processing device 1 may be an electronic device such as, for example, a personal computer and a smartphone.

Although it is described that the information processing device 1 according to the first embodiment includes the display unit 130 which performs visual display, the present invention is not limited to the above and the information processing device 1 may also include a voice emission unit which notifies the user of information with voice. The display unit 130 or the voice emission unit functions as a notification unit.

Although it is described that the control unit 160 in the information processing device 1 according to the first embodiment parses the numerical formula in a case where the edited value is input and decides whether the multiplication emission is contained in the numerical formula, the present invention is not limited to the above. The control unit 160 may decide whether the trigonometric function is contained in the numerical formula. In a case where the trigonometric function is contained in the numerical formula, the control unit 160 changes the setting to any one of the setting that the unit of angle is defined as the degree, the setting that the unit of angle is defined as the radian or/and the setting that the unit of angle is defined as the grade in the arithmetic operation program setting processing.

Figure 21:
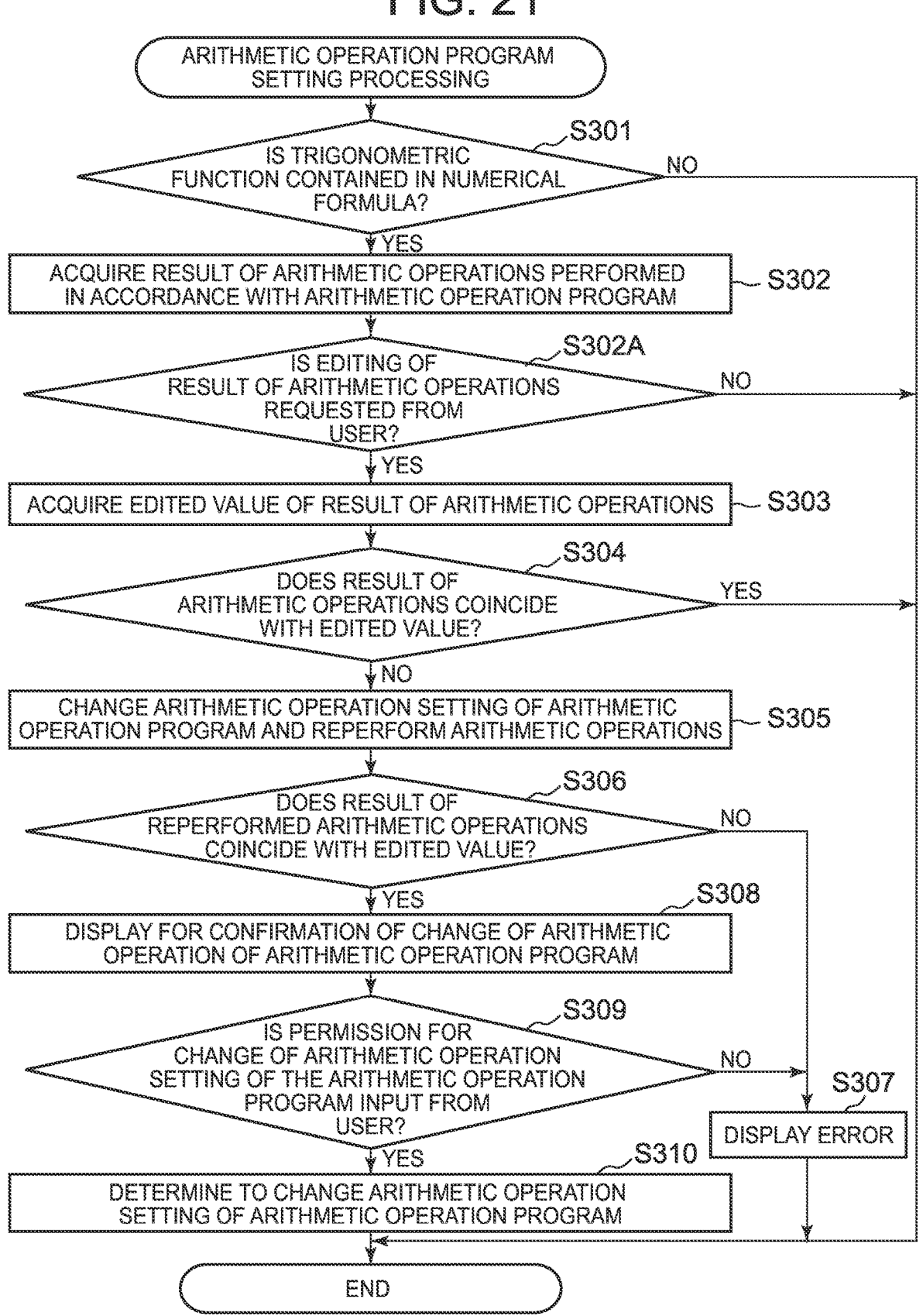
FIG. 21 is a flowchart illustrating one example of arithmetic operation program setting processing that a control unit of an information processing device according to a modified example executes.

FIG. 21 is a flowchart illustrating one example of arithmetic operation program setting processing that the control unit 160 in the information processing device 1 according to the modified example executes. The arithmetic operation program setting processing will be described with reference to the flowchart in FIG. 21.

In a case where execution of the arithmetic operation program setting processing is started, the control unit 160 parses the numerical formula which is input from the user via the input unit 120 and decides whether the trigonometric function is contained in the numerical formula (step S301). In a case where the trigonometric function is not contained in the numerical formula (step S301: NO), the control unit 160 terminates execution of the arithmetic operation program setting processing.

In a case where the trigonometric function is contained in the numerical formula (step S301: YES), the control unit 160 arithmetically operates the numerical formula in accordance with the arithmetic operation program and acquires the result of arithmetic operations which are performed in accordance with the arithmetic operation program (step S302).

After acquisition of the result of arithmetic operations which are performed in accordance with the arithmetic operation program, the control unit 160 decides whether editing of the result of arithmetic operations is requested from the user (step S302A). In a case where the editing is not requested from the user (step S302A: NO), the control unit 160 terminates execution of the arithmetic operation program setting processing.

In a case where editing of the result of arithmetic operations is requested from the user (step S302A: YES), the control unit 160 acquires the edited value of the result of arithmetic operations which are performed on the numerical formula which is input from the user via the input unit 120 (step S303).

After acquisition of the edited value of the result of arithmetic operations, the control unit 160 decides whether the result of arithmetic operations which are performed in accordance with the arithmetic operation program coincides with the edited value (step S304). In a case where the result of arithmetic operations coincides with the edited value (step S304: YES), the control unit 160 terminates execution of the arithmetic operation program setting processing.

In a case where the result of arithmetic operations does not coincide with the edited value (step S304: NO), the control unit 160 changes the arithmetic operation setting of the arithmetic operation program which pertains to the multiplication omission and reperforms the arithmetic operations (step S305).

After reperformance of the arithmetic operations, the control unit 160 decides whether the result of arithmetic operations which are reperformed coincides with the edited value that the user inputs (step S306).

In a case where the result of arithmetic operations which are reperformed does not coincide with the edited value (step S306: NO), the control unit 160 makes the display unit 130 display a notification for indicating error occurrence (step S307) and terminates execution of the arithmetic operation program setting processing.

In a case whether the result of arithmetic operations which are reperformed coincides with the edited value (step S306: YES), the control unit sets the arithmetic operation setting which is used in reperformance of the arithmetic operations as the change candidate for the arithmetic operation setting of the arithmetic operation program and makes the display unit 130 display a notification for confirming with the user about whether it is permitted to change the arithmetic operation setting of the arithmetic operation program (step S308).

After making the display unit 130 display the notification for confirming with the user about whether it is permitted to change the arithmetic operation setting of the arithmetic operation program, the control unit 160 decides whether permission for change of the arithmetic operation setting of the arithmetic operation program is input from the user (step S309).

In a case where the permission for change of the arithmetic operation setting of the arithmetic operation program is not input from the user (step S309: NO), the control unit 160 executes the process in step S307 and terminates execution of the arithmetic operation program setting processing.

In a case where the permission for change of the arithmetic operation setting of the arithmetic operation program is input from the user (step S309: YES), the control unit 160 determines to change the arithmetic operation setting of the arithmetic operation program, makes the storage unit 150 store that the arithmetic operation setting of the arithmetic operation program is changed (step S310) and terminates execution of the arithmetic operation program setting processing.

In this modified example, the control unit 160 decides whether it is preferable to modify the arithmetic operation program in step S302A, step S304, step S306 and step S309.

It becomes possible for the information processing device 1 according to the modified example to acquire the result of arithmetic operations that the target person (the user) intends to acquire with ease owing to provision of the above configuration and execution of the arithmetic operation program setting processing.

In addition, in a case where the trigonometric function is contained in the numerical formula, it becomes possible for the information processing device 1 according to the modified example to modify with ease the arithmetic operation program which pertains to the trigonometric function and therefore which would readily bring about a result of arithmetic operations that the user does not intend to obtain and to avoid modification of the arithmetic operation program that the user does not wish by modifying the arithmetic operation program so as to set the unit of angle to the degree, the radian or the grade.

Although, in the first embodiment, the control unit 160 decides whether it is preferable to modify the arithmetic operation program in step S102A, step S104, step S106 and step S109, it is not typically necessary to execute all processes in these steps and execution of these processes may be appropriately omitted. The same thing also applies to processes in step S401, step S402, step S404, step S405 and step S407 in the second embodiment, to processes in step S202A, step S204, step S206 and step S209 in the third embodiment, to processes in step S501, step S502, step S504, step S505, step S507 and step S510 in the fourth embodiment and to processes in step S302A, step S304, step S306 and step S309 in the modified example.

Although, in the third embodiment, it is described that the information processing device 2 accepts inputs of the answer correctness/incorrectness of which the user wishes to change and of the correctness/incorrectness of the answer which is so changed and changes the arithmetic operation program in accordance with the inputs in regard to the zero-padded decimals after the decimal point, the present invention is not limited to the above. The information processing device 2 may accept inputs of the answer correctness/incorrectness of which the user wishes to change and the correctness/incorrectness of the answer which is so changed and to change the arithmetic operation program in accordance with the inputs in regard to the unit of angle of the trigonometric function.

Although the answers which each contains the zero-padded decimals after the decimal point is input as the answer the correctness/incorrectness of which is wished to be edited by the user is input into the terminal 3, for example, as illustrated in FIG. 15, the present invention is not limited to the above and an answer which contains the angle or the trigonometric function may be input into the terminal 3 as the answer the correctness/incorrectness of which is wished to be edited.

In the example in FIG. 15, the control unit 260 receives and acquires the edited arithmetic operation result data which contains the angle or the trigonometric function from the terminal 3 and then changes the unit of angle in such a manner that the answer that the user decides as the correct answer (or the incorrect answer) becomes the correct answer (or the incorrect answer). As a method that the control unit 260 changes the unit of angle, a method of performing calculations while changing the unit of angle until the answer that the user sets as the correct answer emerges and a method of estimating the unit of angle by using an inverse trigonometric function and changing the unit of angle to the estimated unit of angle may be used. However, the present invention is not limited to the above and it is possible to use an optional method.

In the third embodiment, it is described that the user operates the terminal input unit 320, inputs the answer the correctness/incorrectness of which the user wishes to change and the correctness/incorrectness of the answer which is so changed as the edited arithmetic operation result data and the information processing device 2 changes the decision of correctness/incorrectness which is based on the number of zero-padded digits of the decimals after the decimal point.

However, the present invention is not limited to the above. Only the number of zero-padded digits of the decimals which are displayed as the answer may be changed without changing the correctness/incorrectness decision.

Likewise, in the fourth embodiment, it is described that the information processing device 2 changes the grade setting data on the basis of the change candidate data. However, the present invention is not limited to the above. Only the number of zero-padded digits which are displayed on the screen may be changed without changing the grade setting data.

In the fourth embodiment, it is described that the control unit 260 in the information processing device 2 transmits the notification for inquiring the user about whether it is preferable to change the grade setting data and the contents which are changed in association with data change to the terminal 3 via the communication unit 270, and the terminal 3 contains the change candidate data which indicates the change candidate which is selected by the user in the grade setting data and transmits the grade setting data to the information processing device 2 via the terminal communication unit 370. However, the present invention is not limited to the above. The information processing device 2 may directly inquire the user about whether it is preferable to change the grade setting data and the contents which are changed by using a unit which informs the user of data change and may accept a response directly from the user by using a unit which accepts an input operation from the user.

In each of the second and fourth embodiments, it is described that the control unit 260 of the information processing device 2 executes the program for deciding whether the answer is correct or incorrect in accordance with the number of zero-padded digits of decimals after the decimal point and thereby evaluating the answer. However, the present invention is not limited to the above. The control unit 260 may decide whether the answer is correct or incorrect in accordance with the unit of angle and thereby evaluate the answer. The control unit 260 may execute such a program for answer evaluation that, for example, "90°" is defined as a correct answer and "$\pi/2$ rad" is defined as an incorrect answer.

In each of the first to fourth embodiments and the modified example, it is described that the information processing device 1 or 2 changes the setting to any one of the setting that the unit of angle is defined as the degree, the setting that the unit of angle is defined as the radian and the setting that the unit of angle is defined as the grade in the trigonometric function. However, the present invention is not limited to the above. The arithmetic operation program may be changed such that the unit of angle in the trigonometric function is changed to any one of a plurality of mutually different units, not limited to the degree, the radian and the grade.

In the third and fourth embodiments and the modified example, "grading" not only means to give a specific grade in a case where the answer is correct but also means to evaluate the answer on a scale of several grades such as, for example, A, B and C.

Incidentally, the information processing devices 1 and 2 according to the first to fourth embodiment and the modified example may be embodied by optionally combining with one another.

Incidentally, it is not only possible to provide the information processing devices 1 and 2 as information processing devices which each has in advance the configuration for realizing the function which pertains to the present invention and but also possible to make an existing information processing device function as either the information processing device 1 or the information processing device 2 according to the present invention by application of a program concerned. That is, the program for realizing the function which is brought about by the information processing devices 1 and 2 which are exemplified in the first to fourth embodiments and the modified example is applied so as to make it possible for the CPU and so forth which control the operation of the existing information processing device to execute the program and thereby it becomes possible to make the existing information processing device function as the information processing device according to the present invention. In addition, it is possible to perform an information processing method according to the present invention by using either one of the information processing devices 1 and 2.

In addition, an application method for such a program as above is optional. It is possible to apply the program by storing the program into a computer-readable storage medium such as, for example, a flexible disc, a CD (Compact Disc)-ROM, a DVD (Digital Versatile Disc)-ROM, a memory card and so forth. Further, it is also possible to superimpose the program on carrier waves and to apply the program via a communication medium such as the Internet and so forth. The program may be distributed by posting on, for example, a bulletin board (BBS: Bulletin Board System) on a communication network. Then, the program application method may be also configured to make it possible to execute the above processing by launching this program and executing the program similarly to other application programs under the control of an OS (Operating System).

Although the preferred embodiments and the modified example of the present invention are described above, the present invention is not limited to such specific embodiments and modified example as above and the present invention covers the invention which is described in What Is Claimed Is and a range of equivalency thereof.

What is claimed is:

1. An information processing device comprising:
a display;
a storage storing a plurality of predetermined arithmetic operation programs which differ from each other with respect to an order in which operations for solving a same numerical formula are performed;
an input device; and
at least one hardware processor operatively coupled to the display, the storage, and the input device, the at least one hardware processor being configured to selectively operate under control of the plurality of predetermined arithmetic operation programs stored in the storage to execute processes comprising:
acquiring, in response to an input operation by a target person via the input device, edited arithmetic operation result data indicating an intended calculated result of arithmetic operations performed with respect to a displayed numerical formula displayed on the display;
determining, based on a result of a comparison between (i) the edited arithmetic operation result data and (ii) provisional calculated result data indicating a provisional calculated result of arithmetic operations performed by the at least one hardware processor with respect to the displayed numerical formula using a currently set arithmetic operation program from among the plurality of arithmetic operation programs, whether or not to change the currently set arithmetic operation program to another arithmetic operation program from among the plurality of arithmetic operation programs stored in the storage; and in response to determining to change the currently set arithmetic operation program, automatically controlling to change the currently set arithmetic operation program to the another arithmetic operation program.

2. The information processing device according to claim 1, wherein a result of arithmetic operations performed on the displayed numerical formula, which is derived by executing the another arithmetic operation program having been changed, coincides with the intended calculated result which is indicated in the edited arithmetic operation result data.

3. The information processing device according to claim 1, wherein in a case where a multiplication sign is omitted in the displayed numerical formula and it is determined in the determining to change the currently set arithmetic operation program, the controlling controls to set, as the another arithmetic operation program, one of (i) an arithmetic operation program in which a multiplication operation has a higher priority from among multiplication and division operations, and (ii) an arithmetic operation program in which the multiplication and division operations have equal priorities.

4. The information processing device according to claim 1, wherein in a case where a result of arithmetic operations performed on the displayed numerical formula by executing the currently set arithmetic operation program includes a decimal point and it is determined in the determining to change the currently set arithmetic operation program, the controlling controls to set the another arithmetic operation program such that a number of zero-padded digits after the decimal point in a result of arithmetic operations performed on the displayed numerical formula, which is derived by executing the another arithmetic operation program having been changed, differs with respect to a number of zero-padded digits after the decimal point in the result of the arithmetic operations performed on the displayed numerical formula by executing the currently set arithmetic operation program.

5. The information processing device according to claim 4, wherein:

the plurality of arithmetic operation programs stored in the storage include a program which is used to arithmetically operate correct answer data which is adapted to decide whether a given answer given by an answerer to a numerical problem expressed by the displayed numerical formula is correct or incorrect in accordance with a number of zero-padded digits after the decimal point which is contained in the given answer, the edited arithmetic operation result data acquired in response to the input operation by the target person via the input device comprises edited correct answer data indicating a correct answer or an incorrect answer of the numerical problem, and the controlling controls to change the currently set arithmetic operation program such that the number of zero-padded digits after the decimal point in the correct answer data is changed based on the edited correct answer data.

6. The information processing device according to claim 1, wherein in a case where a trigonometric function is contained in the displayed numerical formula and it is determined in the determining to change the currently set arithmetic operation program, the controlling controls to change the arithmetic operation program such that a unit of angle in the trigonometric function is changed to one of a plurality of mutually different units.

7. The information processing device according to claim 6, wherein:

the plurality of arithmetic operation programs stored in the storage include a program which is used to arithmetically operate correct answer data which is adapted to decide whether a given answer given by an answerer to a numerical problem expressed by the displayed numerical formula is correct or incorrect in accordance with the unit of angle in the trigonometric function which is contained in the given answer, the edited arithmetic operation result data acquired in response to the input operation by the target person via the input device comprises edited correct answer data indicating a correct answer or an incorrect answer of the numerical problem, and the controlling controls to change the currently set arithmetic operation program based on the edited correct answer data such the unit of angle in the correct answer data is changed.

8. An information processing device comprising:

a display;

a storage storing a plurality of predetermined arithmetic operation programs which differ from each other with respect to an order in which operations for solving a same numerical formula are performed;

an input device; and at least one hardware processor operatively coupled to the display, the storage, and the input device, the at least one hardware processor being configured to selectively operate under control of the plurality of predetermined arithmetic operation programs stored in the storage to execute processes comprising:

receiving, via the input device, input data which is input by a target person;

determining whether the input data comprises specific data which pertains to a predetermined type of numerical formula;

in response to determining that the input data comprises the specific data, controlling the display to output an inquiry to the target person, the inquiry inquiring whether to change a currently set arithmetic operation program which pertains to solving the predetermined type of numerical formula to another arithmetic operation program, from among the plurality of predetermined arithmetic operation programs stored in the storage; and in response to receiving, via the input device, a response to the inquiry from the target person indicating that a change of the currently set arithmetic operation program is permitted, changing the currently set arithmetic operation program to the another arithmetic operation program.

9. The information processing device according to claim 8, wherein:

the predetermined type of numerical formula is a formula in which a multiplication sign is omitted, the inquiry comprises a first inquiry regarding a priority of a multiplication operation from among multiplication and division operations contained in the predetermined type of numerical formula, and the changing the currently set arithmetic operation program includes setting, as the another arithmetic operation program, one of (i) an arithmetic operation program in which the multiplication operation has a higher priority from among the multiplication and division operations, and (ii) an arithmetic operation program in which the multiplication and division operations have equal priorities.

10. The information processing device according to claim 8, wherein:

the predetermined type of numerical formula is a formula containing a trigonometric function, the inquiry comprises a second inquiry regarding which one of a plurality of mutually different units is to be used as a unit of angle in the trigonometric function, and the changing comprises changing the currently set arithmetic operation program such that the unit of angle in the trigonometric function is changed to the one of the plurality of mutually different units.

11. The information processing device according to claim 10, wherein the plurality of arithmetic operation programs stored in the storage include a program which is adapted to evaluate a given answer given by an answerer to a numerical problem expressed by a formula of the predetermined type in accordance with the unit of angle in the trigonometric function which is contained in the given answer.

12. The information processing device according to claim 8, wherein:

in a case where a result of arithmetic operations performed on the predetermined type of numerical formula using the currently set arithmetic operation program includes zero-padded digits after a decimal point, the inquiry comprises a third inquiry regarding a number of zero-padded digits after the decimal point, and the changing comprises changing the currently set arithmetic operation program to the another arithmetic operation program to thereby change the number of zero-padded digits after the decimal point in the result of arithmetic operations performed on the predetermined type of numerical formula using the another arithmetic operation program.

13. The information processing device according to claim 12, wherein:

the plurality of arithmetic operation programs stored in the storage include a program which is adapted to derive an evaluation result with respect to a given answer given by an answerer to a numerical problem expressed by the predetermined type of numerical formula in accordance with the number of zero-padded digits after the decimal point contained in the given answer, and the changing comprises changing the currently set arithmetic operation program in such a manner that a result of evaluation of the answer that a specific number of digits of the decimals are zero-padded is changed.

14. An information processing method executed under control of a hardware processor of an information processing device, the information processing device further including a display, a storage storing a plurality of predetermined arithmetic operation programs which differ from each other with respect to an order in which operations for solving a same numerical formula are performed, and an input device, and the method comprising:

acquiring, in response to an input operation by a target person via the input device, edited arithmetic operation result data indicating an intended calculated result of arithmetic operations performed with respect to a displayed numerical formula displayed on the display;

determining, based on a result of a comparison between (i) the edited arithmetic operation result data and (ii) provisional calculated result data indicating a provisional calculated result of arithmetic operations performed by the hardware processor with respect to the displayed numerical formula using a currently set arithmetic operation program from among the plurality of arithmetic operation programs, whether or not to change the currently set arithmetic operation program to another arithmetic operation program from among the plurality of arithmetic operation programs stored in the storage; and in response to determining to change the currently set arithmetic operation program, automatically controlling to change the currently set arithmetic operation program to the another arithmetic operation program.

15. A non-transitory computer-readable storage medium storing a program for controlling an information processing device thereon, the information processing device including a display, a storage storing a plurality of predetermined arithmetic operation programs which differ from each other with respect to an order in which operations for solving a same numerical formula are performed, an input device, and a hardware processor, and the program being executable by the hardware processor to control the hardware processor to execute processes comprising:

acquiring, in response to an input operation by a target person via the input device, edited arithmetic operation result data indicating an intended calculated result of arithmetic operations performed with respect to a displayed numerical formula displayed on the display;

determining, based on a result of a comparison between (i) the edited arithmetic operation result data and (ii) provisional calculated result data indicating a provisional calculated result of arithmetic operations performed by the hardware processor with respect to the displayed numerical formula using a currently set arithmetic operation program from among the plurality of arithmetic operation programs, whether or not to change the currently set arithmetic operation program to another arithmetic operation program from among the plurality of arithmetic operation programs stored in the storage; and in response to determining to change the currently set arithmetic operation program, automatically controlling to change the arithmetic operation program to the another arithmetic operation program.

16. An information processing method executed under control of a hardware processor of an information processing device, the information processing device further including a display, a storage storing a plurality of predetermined arithmetic operation programs which differ from each other with respect to an order in which operations for solving a same numerical formula are performed, and an input device, and the method comprising:

receiving, via the input device, input data which is input by a target person;

determining whether the input data comprises specific data which pertains to a predetermined type of numerical formula;

in response to determining that the input data comprises the specific data, controlling the display to output an inquiry to the target person, the inquiry inquiring whether to change a currently set arithmetic operation program which pertains to solving the predetermined type of numerical formula to another arithmetic operation program from among the plurality of predetermined arithmetic operation programs stored in the storage;

in response to receiving, via the input device, a response to the inquiry from the target person indicating that a change of the currently set arithmetic operation program is permitted, changing the currently set arithmetic operation program to the another arithmetic operation program.

17. A non-transitory computer-readable storage medium storing a program for controlling an information processing device thereon, the information processing device including a display, a storage storing a plurality of predetermined arithmetic operation programs which differ from each other with respect to an order in which operations for solving a same numerical formula are performed, an input device, and a hardware processor, and the program being executable by the hardware processor to control the hardware processor to execute processes comprising:

receiving, via the input device, input data which is input by a target person;

determining whether the input data comprises specific data which pertains to a predetermined type of numerical formula;

in response to determining that the input data comprises the specific data, controlling the display to output an inquiry to the target person, the inquiry inquiring whether to change a currently set arithmetic operation program which pertains to solving the predetermined type of numerical formula to another arithmetic operation program from among the plurality of predetermined arithmetic operation programs stored in the storage;

accept in response to receiving, via the input device, a response to the inquiry from the target person indicating that a change of the currently set arithmetic operation program is permitted, changing the currently set arithmetic operation program to the another arithmetic operation program.

* * * * *